May 15, 1956 H. Z. GORA 2,745,135
MOLDING MACHINE
Filed Sept. 29, 1950 11 Sheets-Sheet 4
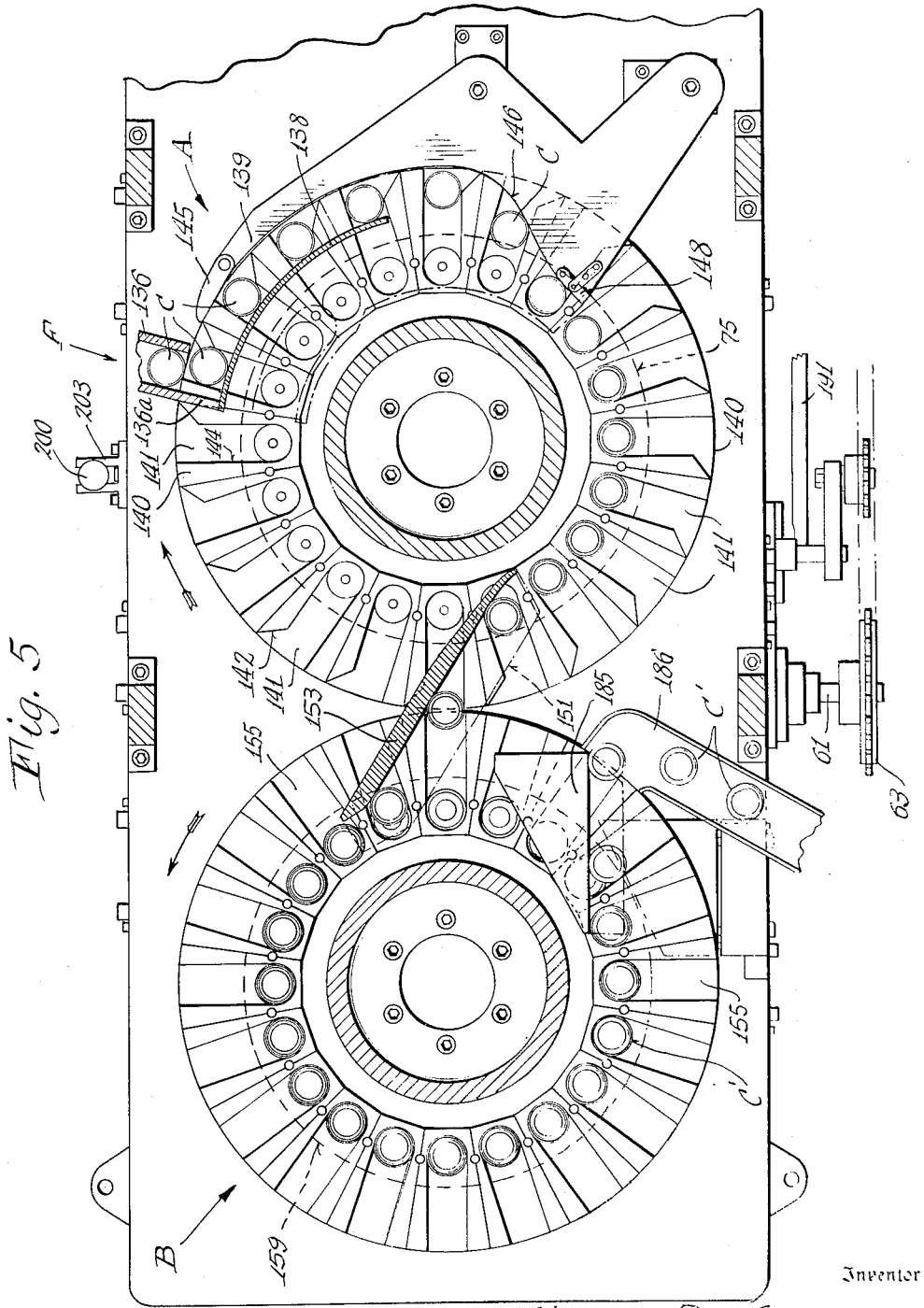
Inventor
Henry Z. Gora
By
Johnson and Kline
Attorneys

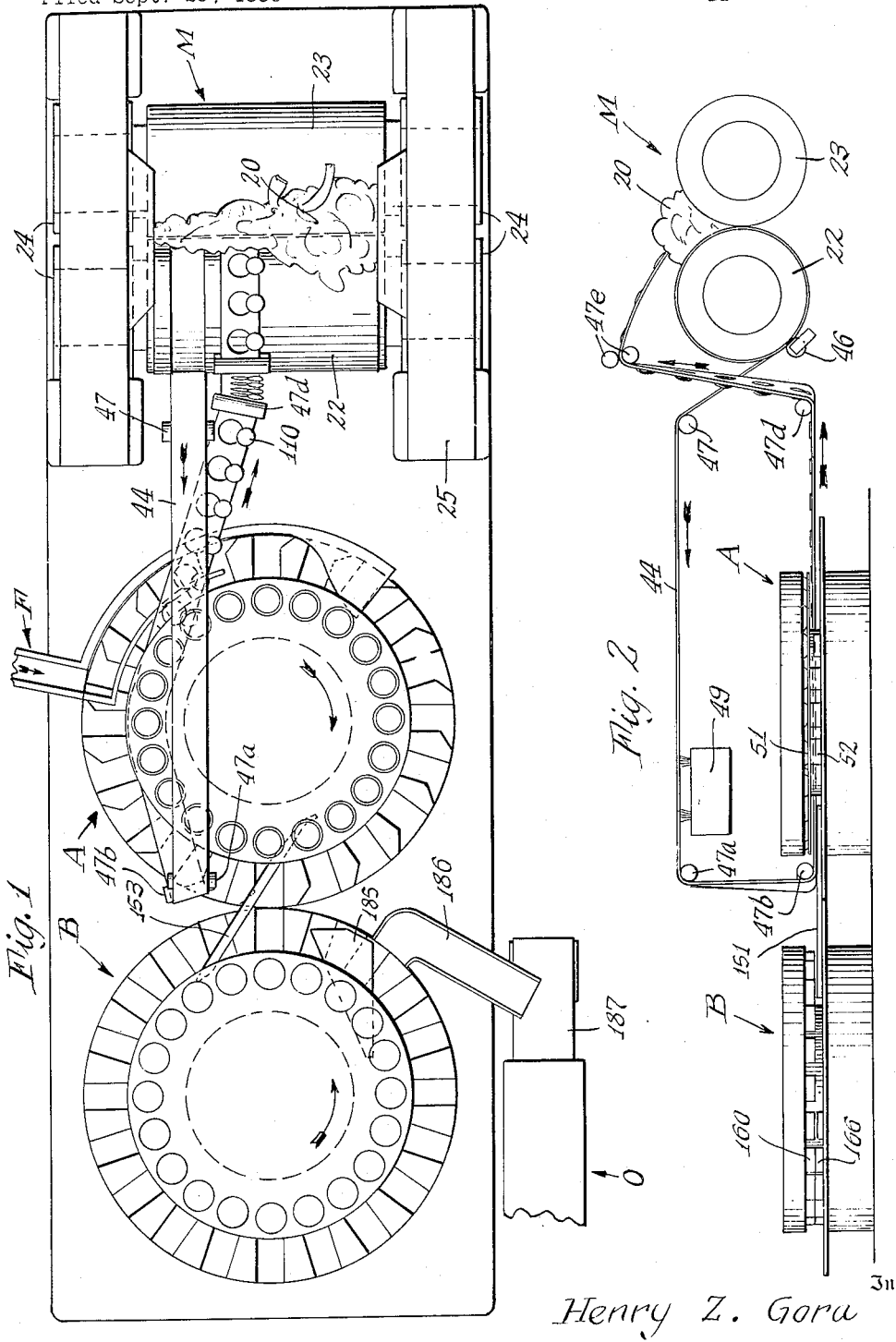

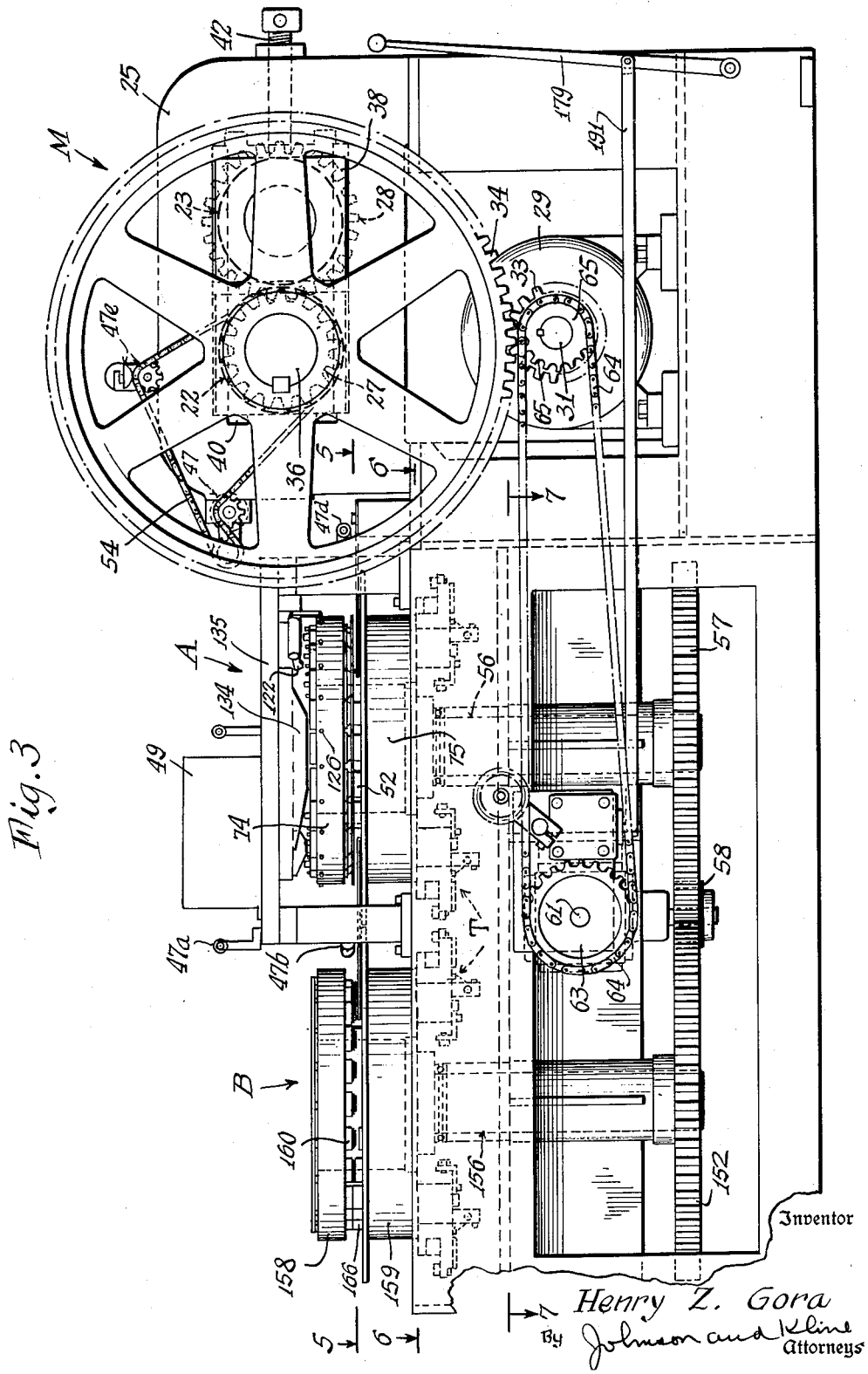

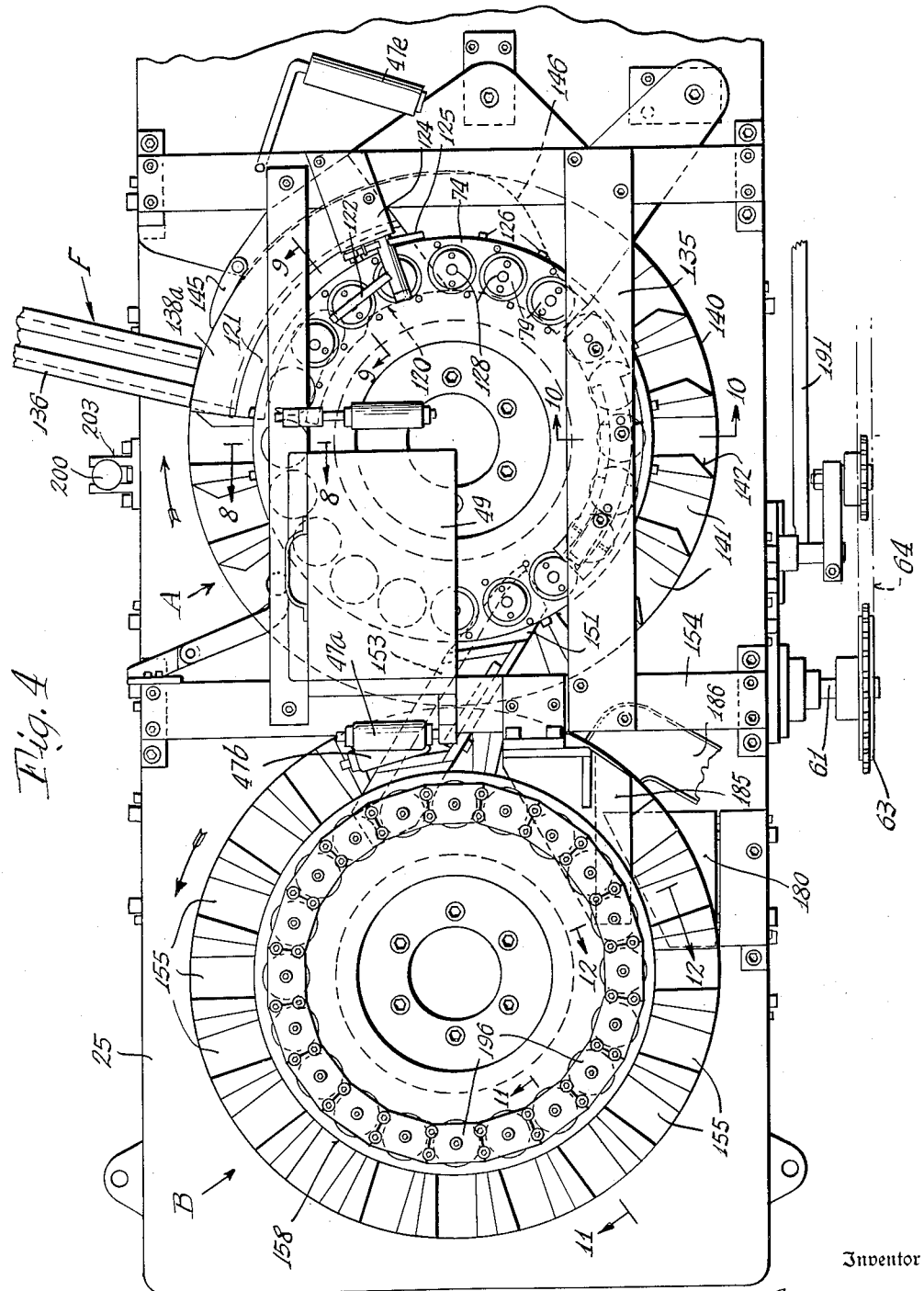

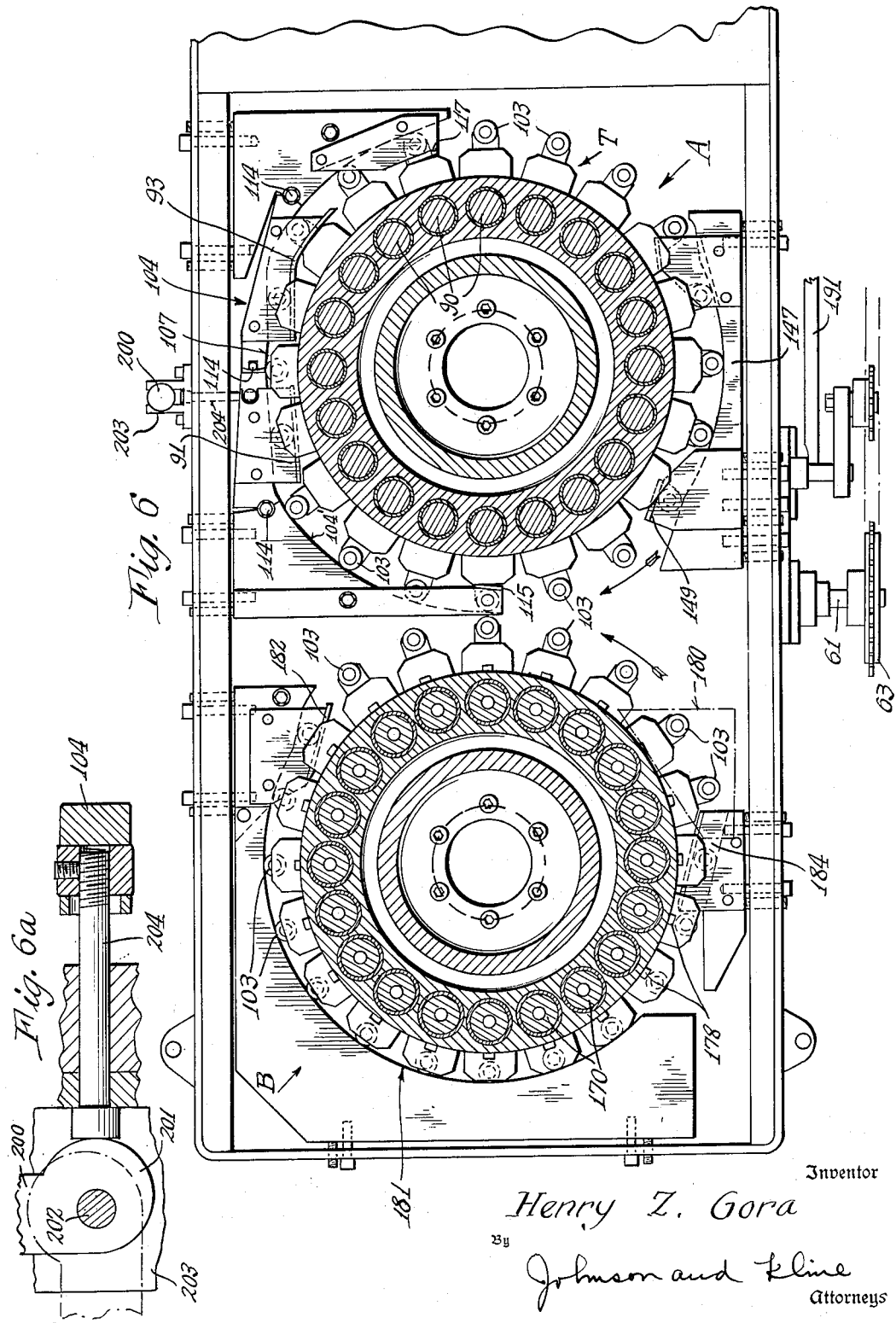

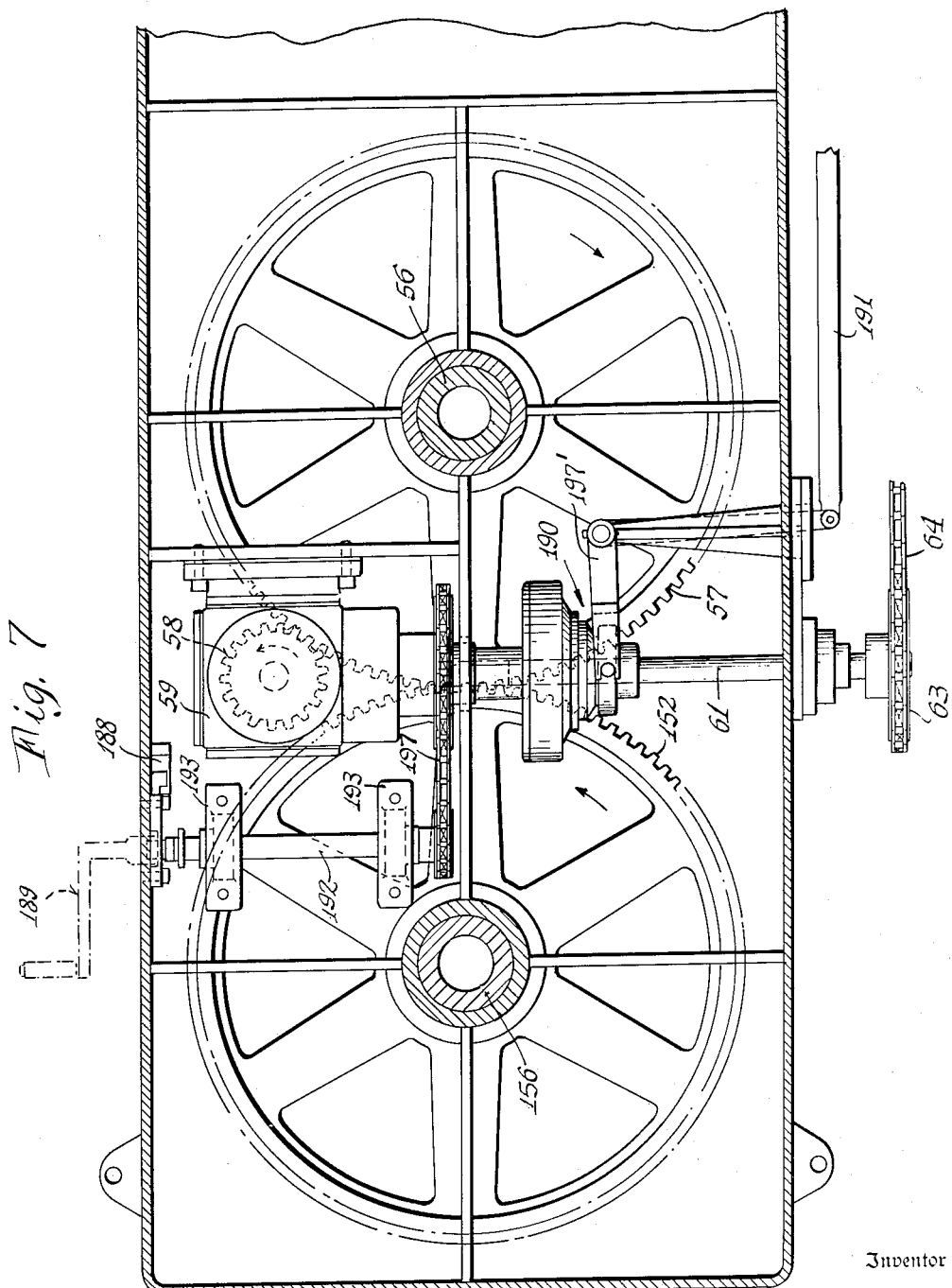

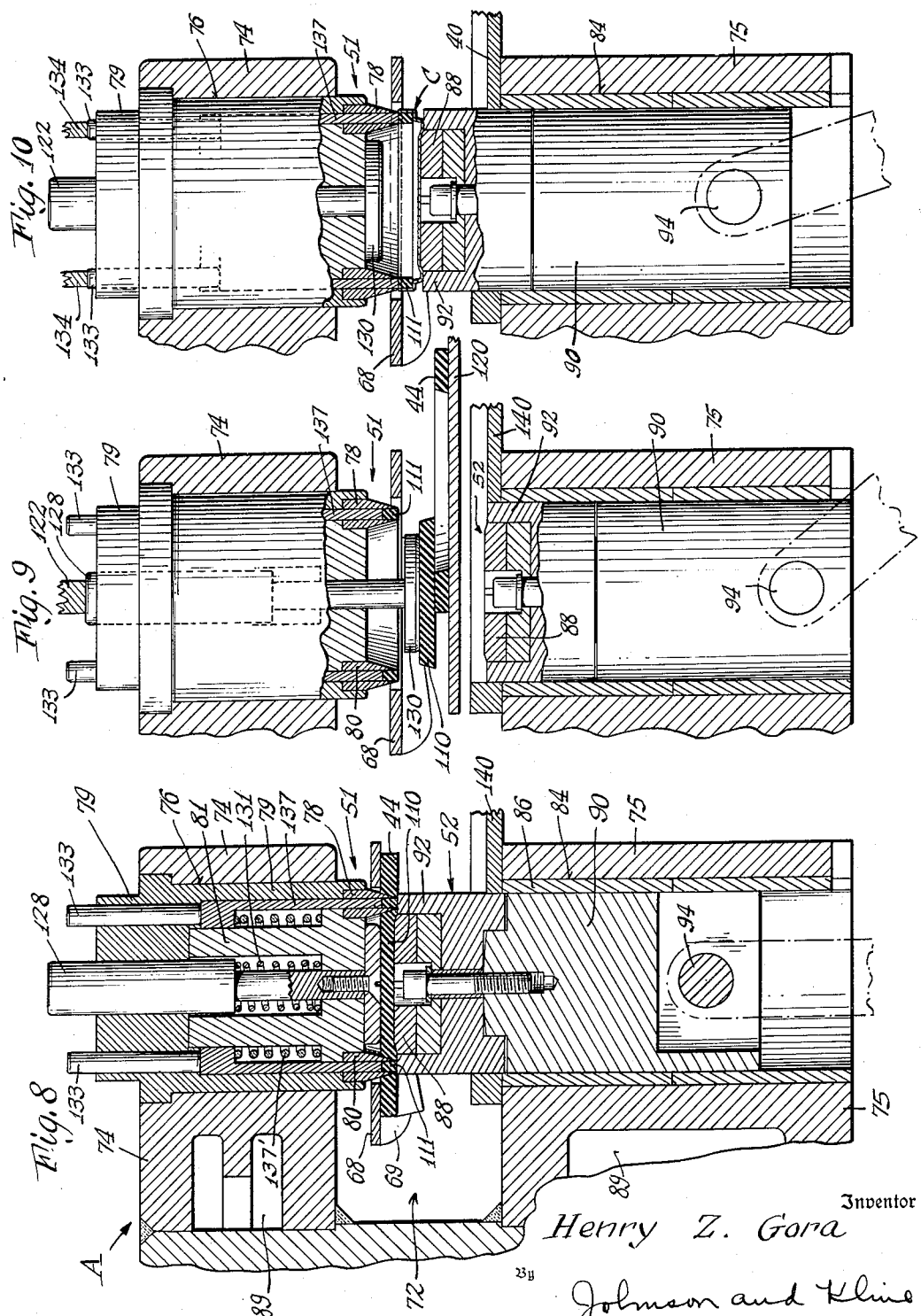

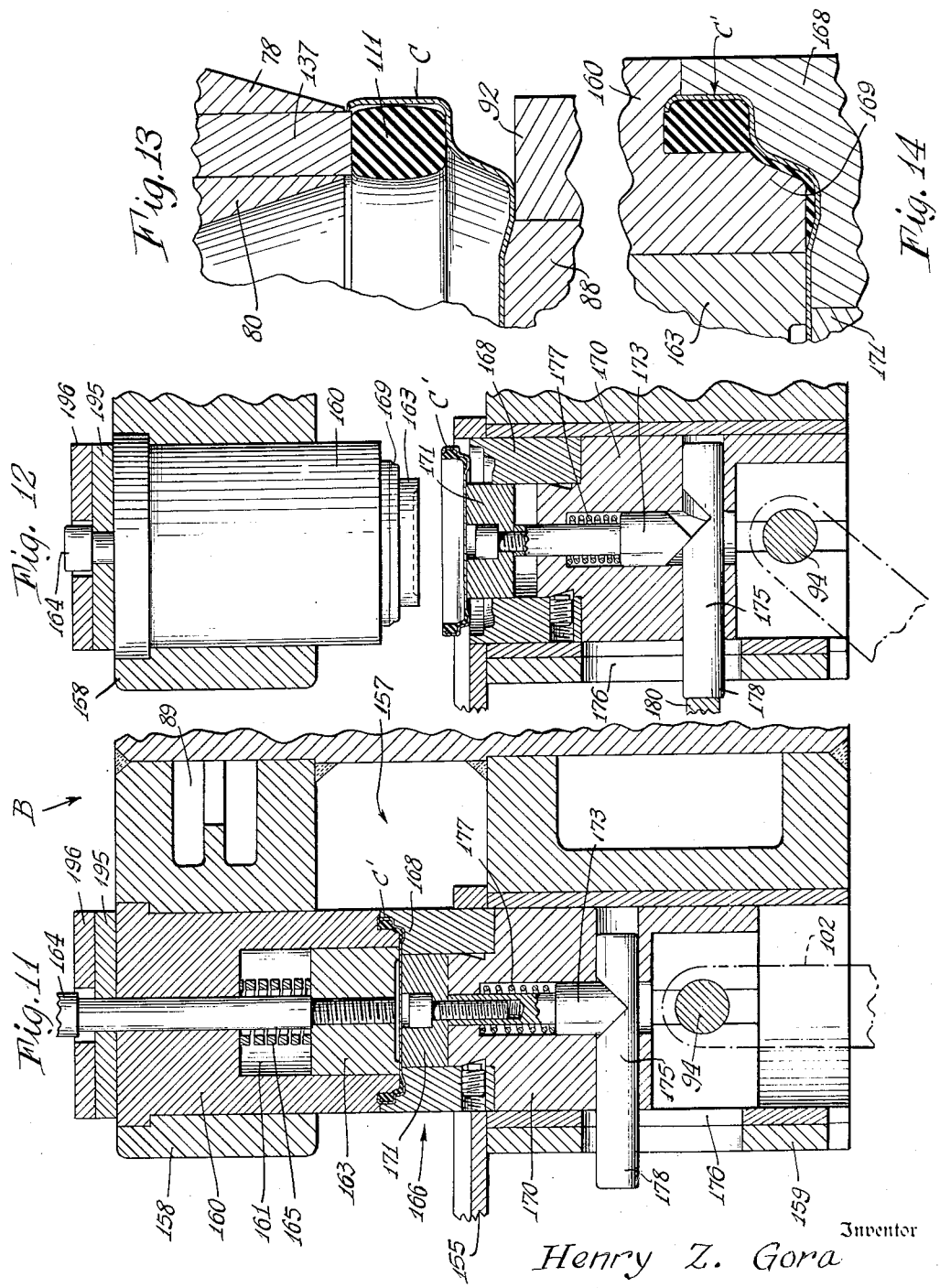

May 15, 1956     H. Z. GORA     2,745,135
MOLDING MACHINE
Filed Sept. 29, 1950     11 Sheets-Sheet 9
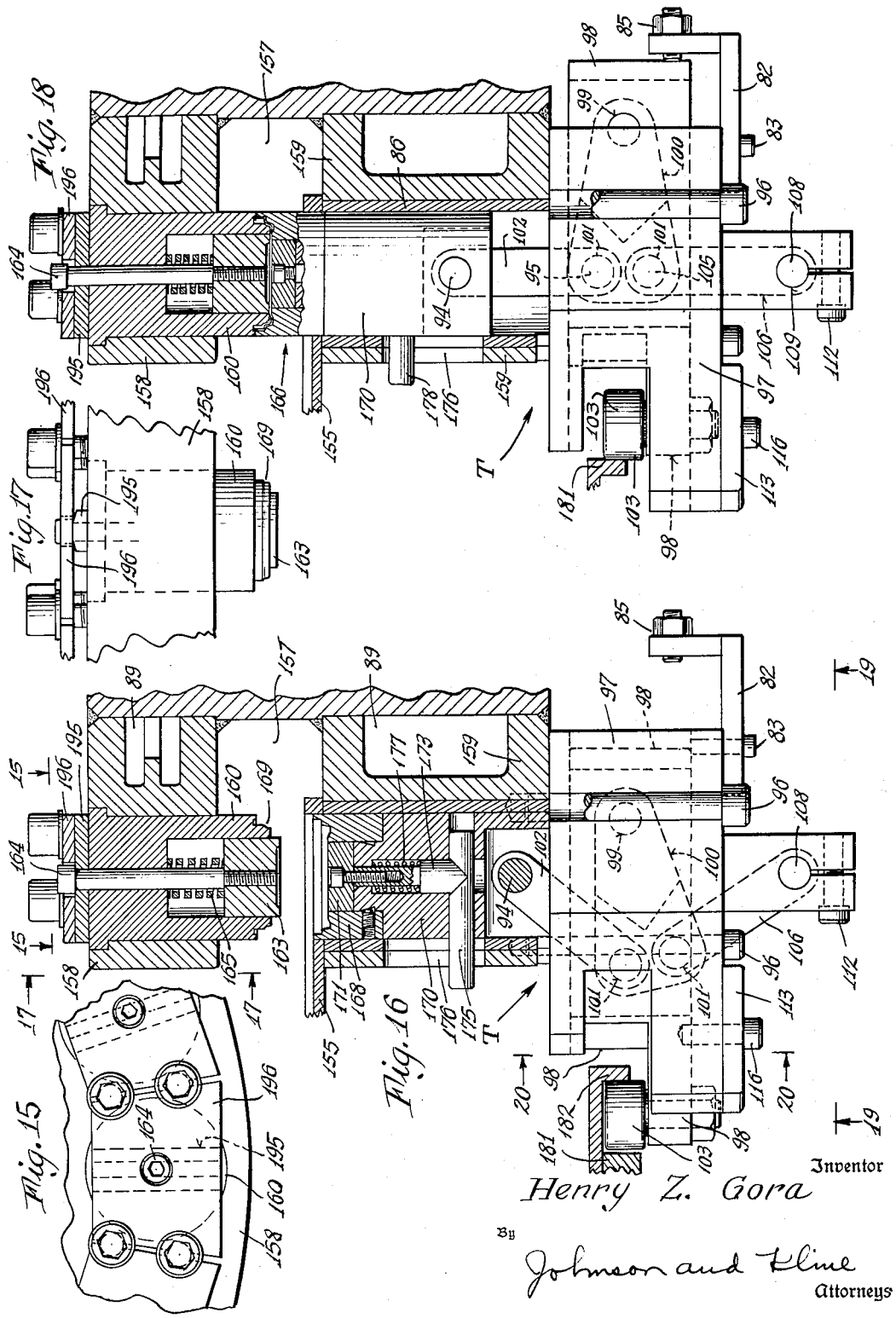
Inventor
*Henry Z. Gora*
By
*Johnson and Kline*
Attorneys

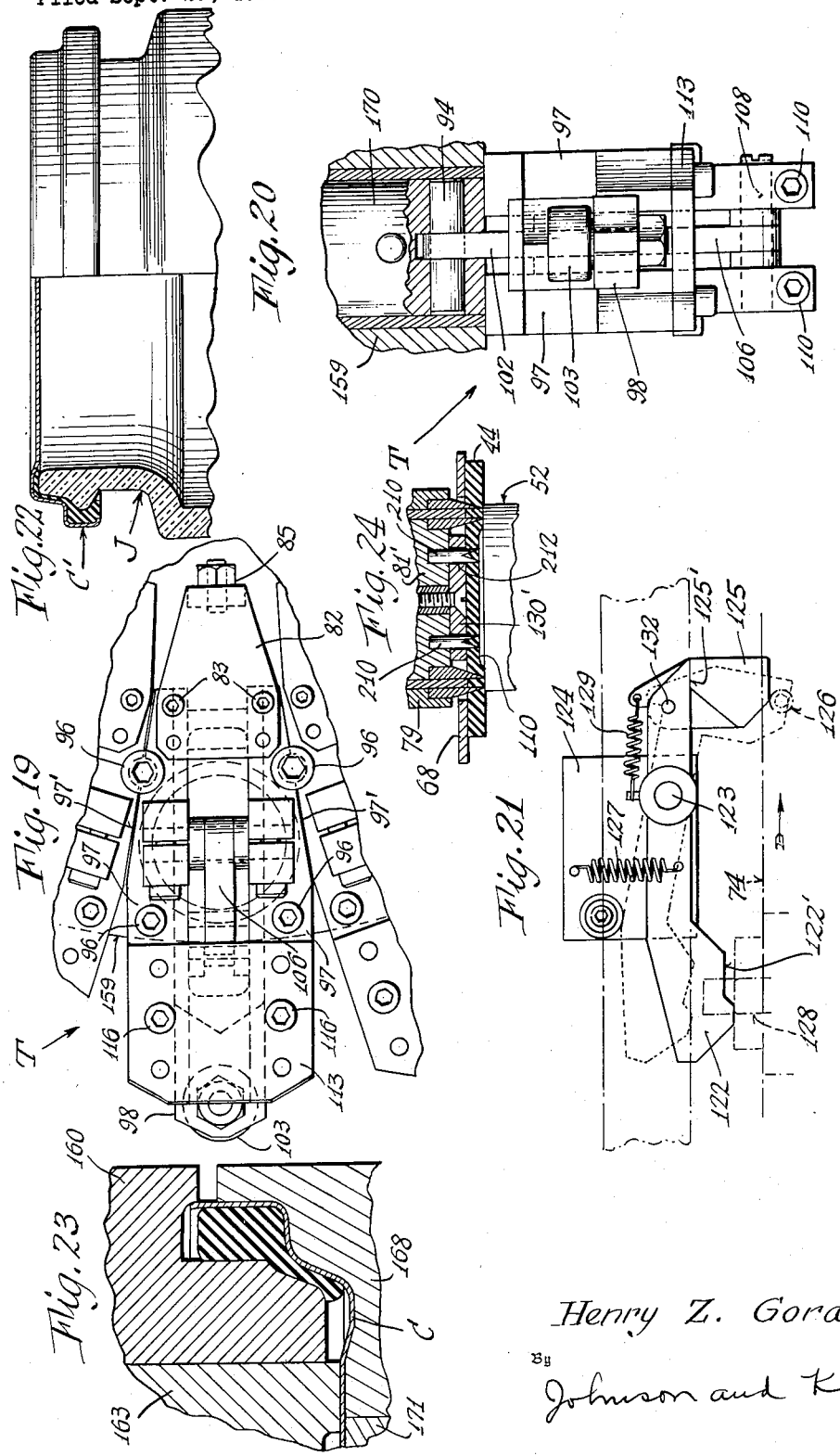

May 15, 1956 H. Z. GORA 2,745,135
MOLDING MACHINE
Filed Sept. 29, 1950 11 Sheets-Sheet 11

Inventor
Henry Z. Gora
By
Johnson and Kline
Attorneys

United States Patent Office 2,745,135
Patented May 15, 1956

2,745,135

MOLDING MACHINE

Henry Z. Gora, Stratford, Conn., assignor, by mesne assignments, to Anchor Hocking Glass Corporation, Lancaster, Ohio, a corporation of Delaware Application September 29, 1950, Serial No. 187,394

23 Claims. (Cl. 18—5)

The present invention relates to improvements for making and molding thermoplastic or elastomeric materials, especially materials of rubber or rubbery nature. More specifically, this invention relates to the manufacture of closures for containers, such as jars, bottles, etc., containing such thermoplastic or elastomeric materials. The present application is a continuation-in-part of application Serial No. 85,118, filed in the United States Patent Office on April 2, 1949, the patentable subject matter of which was transferred to the present application before abandonment.

Such closures are usually formed of a cap of stamped-out sheet metal or of other suitable material and an annular or circular resilient gasket positioned therein so as to provide sealing engagement with the container opening to which the closure is applied. In side-seal closure, with which this invention is illustrated and described, the closure member is normally provided with a cap having a downwardly turned flange and the resilient gasket is adherently positioned therein so as to have gripping and sealing engagement with the upper portion of the side walls of the containers and sealing engagement with the top surface of the mouth of the container. The downwardly turned flange is sometimes made of a stepped construction having a first annular peripheral flange connected by an intervening step to another annular peripheral flange of smaller diameter. In such a stepped flange construction, the side-seal gasket ring is usually located in the annular peripheral portion of larger diameter.

In the present invention, gasket rings are formed of any suitable material having the desired plastic and moldable qualities and may be either of natural or synthetic origin or a mixture of both.

Heretofore, these gasket rings have generally been made from a rubber compound or similar material which required curing or vulcanizing and one method of manufacture, for example, has been to form the moldable material into an elongated tube; then cure or vulcanize the tube; cut it into rings; and finally position the rings individually and manually in the closure cap to form the composite assembly. As a result, the manufacture of this type of closure has been a slow and relatively expensive operation involving considerable labor costs. Efforts to overcome the difficulties inherent in such manufacture heretofore have not been successful.

A feature of the invention is the provision of apparatus for die-forming an annular gasket blank, then positioning the annular gasket blank in a separate cap or closure member, and molding the blank to finished size and shape after it is in place in the closure member. If the gasket material requires curing or vulcanizing, a further feature of the invention lies in subjecting the material to a curing or vulcanizing operation, in situ, after it has been molded to the desired size and shape and adhered to the separate closure member.

In addition to a saving of time and labor to obtain greater production at a lesser cost, the present invention also effects a great and important saving in the moldable material. The apparatus is so organized and integrated that all of the material fed thereto is either utilized immediately for the manufacture of gasket material or is returned automatically for repreparation and for reuse in forming additional gasket material. Another advantage of the present invention is the provision for the automatic reuse of the perforated strip from which the annular gaskets are blanked and the reuse of the circular portion of the moldable material included within the annular gasket and blanked out therewith.

A further feature of the invention is the provision of blanking dies so formed that the peripherally flanged edge of the closure member is curled inwardly to embed it in the annular gasket and thereby protect it against rusting as well as protect the hands of the user from being cut or scraped by any sharp or rough edges.

The present invention in its more comprehensive form includes the continuous molding of pieces of thermoplastic material by providing a warming or plasticizing mill to produce a continuous strip of moldable material, and a plurality of pairs of cooperating die elements on a rotatable drum to which the strip is fed to successively blank out and form annular gasket blanks and deposit the same within closure members automatically positioned thereunder. After the annular gaskets are blanked out and deposited in the closures, the perforated strip, and the circular disk (if desired), are returned to the warming or plasticizing mill, and the closure members and annular gasket blanks which are deposited therein are automatically transferred to a second rotatable drum having a plurality of pairs of cooperating die elements to successively mold the annular gasket blanks into the finished size and shape, in situ, within the closure members. The formed and molded pieces are then removed from the molding dies and transferred to a suitable support or carrier to receive the application of heat or other agents to cure or vulcanize the moldable material, the length of time of such treatment depending upon the nature, size and shape of the material; the accelerator used therein; etc. In the form of the invention illustrated herein as exemplary thereof, the apparatus prepares the gasket blank and also molds the blank to desired shape. It will be understood that in some embodiments of the invention, at least in some of its aspects, the improved apparatus may be employed to perform either of these operations alone, and that it may be employed to make and form other articles than gaskets. It will also be understood that should it be desired to produce a complete liner or a differently shaped liner for a closure that the part of the apparatus which blanks out and removes the circular disk in the embodiment shown, could be removed or rendered inoperative, or modified to produce the shape, size and thickness of blank of moldable material desired.

For these and other purposes parts of the improvements may be used without others.

Other features and advantages of the invention will hereinafter appear in the following description of the preferred embodiment of the invention.

In the accompanying drawings:

Figure 1 is a schematic showing in plan view of the general assembly of the complete molding machine.

Fig. 2 is a similar view to Fig. 1 in elevation.

Fig. 3 shows in side elevation the improved molding machine of the present invention.

Fig. 4 is a fragmentary plan view showing the blanking-out die supporting drum and the forming die supporting drum.

Fig. 5 is a cross-sectional view taken on the line 5—5 of Fig. 3, showing the path of movement of the closure caps around the rotatable drums.

Fig. 6 is a cross-sectional view taken on the line 6—6 of Fig. 3 showing details of the operating cams.

Fig. 6a is a cross-sectional view showing details of the blanking-out cam control lever.

Fig. 7 is a cross-sectional view taken on the line 7—7 of Fig. 3 showing the driving train of the die carrier drums.

Fig. 8 is a cross-sectional view of the blanking-out dies taken on the line 8—8 of Fig. 4, the blanking out position.

Fig. 9 is a view similar to Fig. 8 of the blanking-out dies taken on the line 9—9 of Fig. 4, the circular disk ejecting position.

Fig. 10 is a cross-sectional view similar to Figs. 8 and 9 of the blanking-out dies taken on the line 10—10 of Fig. 4, the annular gasket-depositing position.

Fig. 11 is a cross-sectional view of the forming dies taken on the line 11—11 of Fig. 4, the annular gasket-forming position.

Fig. 12 is a cross-sectional view of the forming dies taken on the line 12—12 of Fig. 4, the closure member elevating position.

Fig. 13 is a fragmentary cross-sectional view, drawn to a larger scale, of the closure at the moment of transfer of the annular gasket to the closure cap, in the same relative position as Fig. 10.

Fig. 14 is a fragmentary cross-sectional view, drawn to a larger scale, of the closure and annular member during the molding operation in the same relative position as Fig. 11.

Fig. 15 is a fragmentary plan view showing the mounting of the upper die member of the forming dies taken in the direction of the arrows 15 in Fig. 16.

Fig. 16 is a fragmentary cross-sectional side view showing the construction of the forming dies taken on the line 16—16 of Fig. 4, disclosing the configuration of the toggle linkage in the open-die position.

Fig. 17 is a fragmentary view in elevation, showing the mounting of the upper die member of the forming dies taken in the direction of the arrow 17 of Fig. 16.

Fig. 18 is a fragmentary view similar to Fig. 16 disclosing the configuration of the toggle linkage in the closed-die position.

Fig. 19 is a fragmentary bottom view of the toggle linkage taken in the direction of the arrows 19 of Fig. 16.

Fig. 20 is a framentary partial sectional view in elevation of the toggle linkage taken in the direction of the arrows 20 of Fig. 16.

Fig. 21 is a detail view of the rocker arm which ejects the center disk from the blanking-out dies.

Fig. 22 is an edge view partially in section showing the closure on a container.

Fig. 23 is a fragmentary cross-sectional view similar to Fig. 14, showing the extrusion of the gasket blank during molding.

Fig. 24 is a fragmentary cross-sectional view showing a modified construction of the upper blanking-out die in a position corresponding to that of Fig. 8.

Figure 25:
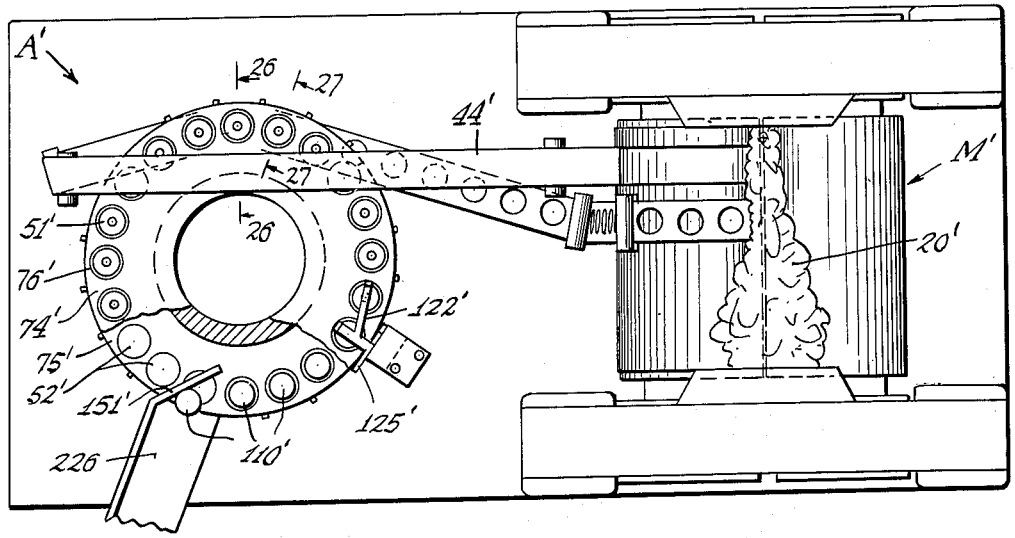
Fig. 25 is a schematic showing in plan view of the general assembly of a modified form of the molding machine.

In the embodiment of the present invention illustrated in the accompanying drawings as exemplary thereof, Figs. 1 and 2 are somewhat diagrammatic views showing the complete apparatus which, for convenience, may be considered as constituting several cooperating devices, namely: a warming mill M, for plasticizing a batch of moldable material and forming a continuous strip therefrom; a rotatable drum A, having mounted thereon relatively movable dies which are capable of receiving between them the continuous strip of moldable material from the mill M, blanking out gaskets, and depositing the same in closure or cap members, a cap feeding device F, for feeding one cap at a time to the drum A, and including means for positioning the caps under the dies; a second rotatable drum B, adjacent the drum A, and operative coordinately therewith, to which the closure cap members and the deposited gasket blanks are transferred and on which the gasket blanks are molded to desired shape in situ on the closure members by relatively movable die members carried by the drum B; and a curing oven O, into which the caps with the molded gasket are fed from the molding wheel B, when, as in the form of the invention herein illustrated, the gasket is an annular member or ring. In forming the ring, a circular disk surrounded by the ring is also formed by the cutting dies and this disk is preferably discharged from the dies before the ring is deposited on the cap, the discharged disk being returned to the mill to be worked into the material constituting the bank on the mill. As illustrated herein, the transfer of the discharged disk to the mill is accomplished by causing the disk to adhere to the blanked-out strip returning to the mill.

*The warming or plasticizing mill M*

As illustrated in Figs. 2 and 3, the mill M, comprises a pair of milling rollers 22 and 23 which are mounted on shafts rotatably supported in bearings 24 in the machine frame 25. The rotatably supported shafts may be connected by gears 27, 28 of different pitch diameters for the purpose of operating the rollers at different speeds to produce the desired milling effect. A motor 29 mounted on the base of the machine drives a motor shaft 31 upon which is keyed a driving pinion 33 which is geared to and drives a large gear 34. Large gear 34 is keyed to shaft 36 upon which is mounted gear 27, secured to and driving the milling roll 22. Gear 27 will thus be driven with large gear 34 and will, in turn, drive gear 28, secured to and driving the other milling roll 23. Due to the different pitch diameters of gears 27 and 28, the milling rolls 23 will thus be rotated at a different speed than milling roll 22 whereby the desired milling effect will be obtained.

One of the roller supporting shafts, such as mounting roller 23, may be mounted in bearing blocks 38 slidably adjustable in slots 40 in the machine frame 25 by means of screws 42 to permit lateral adjustment of the spacing between the milling rollers to provide for different thicknesses of moldable material issuing through the bite thereof.

The temperature of the mill rollers may, as usual, be controlled to obtain the desired warming or plasticizing effect, by passing suitable cooling or heating media such as water, or steam, etc., through the milling rolls and supporting shafts which may be made hollow for this purpose. The milling rolls may be differentially heated to insure that the moldable material issuing through the bite of the milling rolls adheres to the desired roll upon which it is to be further worked.

As illustrated in Figs. 1 and 2, the moldable material which is to be formed into the desired articles is deposited in the trough formed between the milling rollers 22 and 23 of the warming and plasticizing mill, M. A sufficient bank 20 of material is kept in the mill so that it may be sufficiently worked and heated to the desired degree of plasticity.

The rollers 22 and 23 are so spaced that a predetermined quantity of the material is built up as a complete layer on one of the milling rollers. A narrow strip 44 may be separated therefrom by means of a cutting device 46 mounted on the frame 25 and having spaced cutting rollers. As the bank 20 is used up additional material is added to the bank 20 to keep the supply of material in the trough of rolls 22 and 23 substantially constant.

From the roller 22, the continuous strip 44 is guided to the rotatable drum A, by passing it upwardly over a first guide roller 47 and then horizontally over a second guide roller 47a.

During its passage between these guide rollers the continuously moving strip of moldable gasket material may be lubricated by any means 49 well known in the art such as a moistened wick, or a spray means, or any other suitable means over which the strip passes.

The strip is then guided downwardly past a third guide roller 47b which is set at an angle, as illustrated in Figs. 1 and 2, to the second guide roller 47a. The strip, after passing the third guide roller 47b is led to the drum A where it is acted upon by the dies carried by the drum. After this the strip leaves the drum and is guided over rollers 47d and 47e back to the bank on the mill rollers. The rollers 47 and 47e may be power driven by a chain 54 so that the advancing strip 44 is actually pulled from the mill roller while the returning strip 44 is lifted to a height from which it can descend into the bank.

*Rotatable drum A*

The rotatable drum A is fixed to a vertical shaft 56, which, as shown in detail in Fig. 7, has mounted thereon a large gear 57 driven by pinion 58 which is driven through a suitable speed reduction gear box 59 by shaft 61 and sprocket 63 thereon. A chain 64 looped around sprocket 63 and a sprocket 65 on the motor shaft 31 supplies the driving force to the power train to drive the shaft 56 of drum A.

A clutch 190 is situated on shaft 61 and is capable of disconnecting the drive of said drums from motor shaft 31, whereby the drums will be free to remain idle while the plasticizing mill rollers may continue to rotate.

Spaced around the edge of the drum A are a plurality of pairs of cooperating dies 51 and 52 arranged in a circular path intersecting the path of the strip 44 of moldable material so that when the dies 51 and 52 are brought together they will blank from the strip 44 a piece of material of desired shape and quantity and at the same time will clamp or impale the strip 44 so that during the blanking-out operation the strip will travel in the circular path of travel between dies 51, 52. After the blank has been cut, the dies are separated freeing the strip 44, which is now in skeletonized form, so that it may move tangentially away from the drum A over guide rollers 47d and 47e and be returned to the bank 20 as above described.

As shown in Fig. 8, the drum A has a hub portion and an upper flange ring 74 and a lower flange ring 75 which are secured to the hub as by welding, for example, and it is in a space 72 between the upper and lower flanges of the drum that the strip 44 passes and is operated upon.

Arcuately spaced chambers or bores 76 are provided in the upper ring 74 for the reception of the die members 51. In the form shown, each die member has a fixed outer cylindrical cutter 78 mounted on the end of a cylindrical outer cutter holder 79 which is secured within the bore 76 of the ring 74. Each die member also has a fixed inner cylindrical cutter 80 mounted on the end of a cylindrical inner cutter holder 81 which is secured to the outer cutter holder 79 in inwardly spaced concentric relationship thereto, thus defining a narrow cylindrical space therebetween.

Spaced bores 84 are similarly provided within the lower ring 75 in axial alignment with the bores 76 and receive movable die members 52 sliding in bushings 86. The movable die members 52 comprise a pad 88 surrounded by an annular cutter anvil 92 secured to a reciprocating plunger 90.

The upper surface of the cutter anvil 92 is hardened and ground to provide an opposed cooperating surface for the cylindrical cutters 78, 80 mounted on the upper die member 51.

It will be apparent from Fig. 8 that, when strip material 44 is interposed between the upper and lower dies, upward movement of die 52 will raise the cutter anvil 92 to cause the strip to be pierced by the concentrically arranged cylindrical cutters 78, 80 of die 51 whereby an annular gasket blank 111 and an included circular disk 110 are cut out of the strip 44. This occurs at approximately the twelve o'clock position on drum A (Fig. 1).

*Removal of the perforated strip and the circular disk*

Separation of the die members after the blanking operation will leave the circular disk 110 and the annular ring 111 adhering to the cutters in the upper die member 51. The perforated strip, 44, however, drops downwardly from the cutters and falls upon a shield plate 120, shown in Figs. 4 and 9, which is so positioned that its bifurcated leading end 121 surrounds the die members immediately prior to their separation and its body portion presents a broad supporting surface for the perforated strip after the die members have separated. The perforated strip, once released from the grip of the die members, will fall to the shield plate 120 and may be drawn slidably thereover in a diverging line by return guide roller 47d in the direction of the plasticizing mill to be reincorporated therein for reuse.

Immediately after the die members separate and the perforated strip has fallen to the shield plate 120, the circular disk 110 may be removed from the cylindrical cutters. In the form shown, this is done by a spring-pressed rocker arm 122 mounted on a rocker shaft 123 (Figs. 4 and 21) pivotally mounted in a fixed support 124 located over the continuously rotating ring 74. The rocker arm 122 is so positioned that a forwardly extending spring-biased arm 125 pivotally supported thereon at 132 is struck periodically by projecting portions 126 of the upper annular ring 74 to swing the rearwardly extending pivotally mounted rocker arm 122 down to strike a stripper plunger 128 a sharp blow at the proper moment. As shown in Fig. 9, downward movement of said stripper plunger 128 drives a stripper 130 secured to its lower end downwardly to eject the circular disk 110 from within the inner cutter and to press it adheringly against the moving, diverging perforated strip 44 supported on the shield plate 120.

The lower portion of the spring biased arm 125 is flat for a sufficient length and remains in contact with portion 126 long enough so as to hold the rocker arm in tilted position with the lower end of the rocker arm 122 in downward position and pressed against the top of the stripper plunger 128 for several degrees of rotation of the drum A. This is the position shown in Fig. 9 wherein the circular disk 110 is being adheringly pressed against the perforated strip. The lower portion of the rocker arm 122 possesses a step 122' which will permit the stripper plunger 128 to rise slightly when it rides off the lowermost portion of arm 122 and moves to a position under the step 122'. This will raise the stripper plunger 128 and stripper 130 a short distance from the circular disk 110 which will be moved slightly in a sidewise direction during this time by the pull of the divergently moving perforated strip to sever all possible adherence of the circular disk to the stripper 130. Therefore, when the stripper plunger 128 rides off the step 122', it will rise to its uppermost position with no possibility of the circular disk following it. It will be appreciated from a consideration of Fig. 9 that, if the stripper plunger 128 were to be depressed by rocker arm 122 and immediately raised, it would be possible for the circular disk to remain adhered to both the strip and to the stripper 130 with the result that the strip material would be pulled upwardly and the circular disk would return to its original position within the inner cutter 80 wherein it could resist lateral movement. This would snag the strip and cause difficulty in the operation of the machine. All this, however, is avoided by the step 122' and the interrupted return of the stripper plunger 128 and stripper 130.

As best shown in Fig. 8, the upward return movement of the stripper 130 and stripper plunger 128 is brought about by a return spring 131 surrounding said plunger and seated against the fixed surface of the inner cutter holder 81.

As shown in Fig. 21, spring 127 is secured to a fixed bracket 124 on the frame 25 and maintains the rocker arm 122 normally in elevated position clear of the ejecting plunger 128. The rearwardly extending rocker arm 125 is pivoted at 132 and is biased by spring 129 so as to be normally in vertically depressed position resting against abutment 125' so as to be struck by the projecting rod 126. This construction will permit a rearward rotation of drum A in which the pin 126 will move to the left as viewed in Fig. 21 and will merely idly flip the rocker arm 125 on pivot 132 and not affect the rocker arm 122. Normal rotation of drum A will, however, cause oscillation of the rocker 125 to strike the ejecting plunger 128 to eject the circular disk 110 from the die within which it is being temporarily retained.

In Fig. 21, the dotted outline represents the position of the knockout rocker arm in normal position to be struck by the projecting stud on the drum A. The full line figure represents the knockout rocker arm in oscillated position and striking the stripper plunger 128.

The perforated strip 44 continues in its diverging path and carries with it the adhering blanked-out circular disk 110 to the plasticizing mill M, to be remilled and reused. Thus, in this form of the invention herein illustrated, the removal of the perforated strip and the circular disks from the cutting die members and the return thereof to the plasticizing mill is accomplished more expeditiously to create a completely integrated cycle of operations with no waste whatsoever.

The annular gasket 111 continues to be retained between the inner and outer cutters and travels to a position where it is to be ejected therefrom and deposited within a closure member automatically positioned thereunder.

The means to eject the annular gasket from within the cutters is shown in Figs. 4, 8 and 10 comprises two pins 133 guided in bores of the outer cutter holder 79 and positioned to be struck by cams 134 mounted on the underside of brackets 135 secured to the machine frame and located over the continuously rotating upper ring 74. At the correct time, the pins 133 engage the cams 134 and are moved downwardly to force downwardly a cylindrical transfer sleeve 137 located within the narrow space between the spaced inner and outer cutters to eject the annular gasket blank 111 positioned therein.

The return upward of the sleeve 137 is accomplished by a return spring 137' which is seated on a shoulder of the inner cutter holder 81 and acts upwardly against a shoulder on the sleeve 137. Upon the release of the downward force exerted by cams 134, the return spring 137' asserts itself and urges the sleeve 137 upwardly from the position shown in Fig. 10 to the position shown in Fig. 8.

The closure cap feeding mechanism

Prior to the ejection of each gasket blank and in synchronization with the movement of the rotatable die supporting drum A, a cap or closure member C is positioned on the top surface of the cutting anvil 92 by the closure loading device F.

As shown in Fig. 5, an inclined cap conveyor chute 136 extends substantially radially from the rotatable die supporting drum A and is filled with caps C positioned edge to edge. The end 136a of the chute extends over the drum A and joins a cap guide comprising an inner guide plate 138, somewhat concentrically located with respect to the rotatable drum A, and an outer guide plate 139 forming a confined passage in a circumferential direction for the caps C. The top wall 138a (Fig. 4) is positioned to prevent the caps from rising out from between the spaced inner and outer plates 138, 139.

Secured to the top surface of the lower ring 75 (Fig. 8) are a series of radial plates or cap guides 140 having grooves 141 therein each of a size to accommodate a single cap C. The entrance of each groove 141 is suitably enlarged by sloping the forward wall 142 to permit a gradual sliding entry of the cap from the radial portion 136 of the cap conveyor into the groove as they come into alignment during rotation of the drum.

The rear wall 144 of the groove is substantially radial and moves the cap forwardly and at the same time the outer peripheral portion of the guide 140 prevents entry of another cap until the next groove 141 is exposed to the mouth of the inclined cap conveyor chute 136 to receive the next cap C. The inner guide plate 138 is positioned to permit the entry of only one cap at a time, and is of sufficient length to keep several caps in circumferential position awaiting vertical alignment with the annular gasket in the retaining die.

The cap C is carried in the groove 141 circumferentially between the spaced inner and outer guide plates 138 and 139 of the cap guide until the outer guide plate 139 converges inwardly at 146 and guides the cap inwardly into position upon the suitably contoured face of the annular cutter anvil 92 (Fig. 10) located under the cutters holding the annular gasket which is now ready to be deposited in the positioned cap C.

An adjustable positioning nose 148 is located at the point at which the closure is positioned upon the annular cutter anvil 92 to provide for fine adjustment so that the closure will be accurately positioned in alignment with the annular gasket in the retaining cutter die.

At the opposite end of the outer guide plate 139 is positioned a pivoted release cover 145 for the purpose of facilitating the extracting of the closures C from the grooves 141. Should a jam occur and necessity arise for the removal of a single closure or for the machine to be rotated backwardly, the caps C may be manually removed through the release cover 145 without being required to be driven back into and up through the cap feeding chute 136.

Inasmuch as the cutters holding the annular gasket 111 are located a distance above the cap C, which is now seated on the annular cutter anvil 92, it has been found advisable to concomitantly raise the anvil when the gasket is being ejected so that it moves a much shorter distance and decreases the possibility of its falling crookedly from the cutters and landing in an improper position. As shown in Figs. 10 and 13, the cap C is positioned immediately below the cutters and the annular gasket is being properly positioned by the transfer sleeve 137. As shown in Fig. 10, the annular cutter anvil 92 is partially raised in this movement and approaches the cylindrical inner and outer cutters 78 and 80 so that, when the annular gasket 111 is ejected from between the cutters, it is moved a very short distance and is properly positioned within the flange of the closure. Such positioning will take place at approximately the six o'clock position of drum A (Fig. 4).

The cap and the annular gasket inserted therein then are carried forwardly on the rotatable drum A, until a stationary transfer device 151 shifts it to the molding wheel.

As shown in Figs. 1, 4 and 5, the stationary transfer device 151 is supported on a bracket 154 mounted on the table frame and comprises an upper wall or ceiling which prevents the cap from rising or lifting out of its groove and a side wall 153 which extends across the face of the lower die 52 and sweeps the cap therefrom outwardly into the corresponding groove 141 of the cap guide member on the rotatable drum A, where it is in readiness to be swept onto the molding wheel.

Instead of making a series of individual radial plates 140, it is possible to make one integral annular ring with grooves therein and to secure such a ring in place merely by three or four bolts. However, the mounting of such a ring is more difficult and such is not at present preferable to the independently mountable and replaceable radial plates 140.

As shown in Fig. 7, a molding wheel or forming drum B is mounted on shaft 156 on the table frame 25 with respect to the rotatable drum A, and rotates in synchronism therewith being geared thereto by gearing 57, 152. The forming drum B has correspondingly extending radial plates and grooved cap guides 155 (Fig. 5) which are so situated that, when the side wall 153 of the transfer device 151 moves the cap C beyond the periphery of the blanking-out drum cap guide 141, the cap is guided into the corresponding grooved cap guide 155 of the forming drum. Such transfer takes place at approximately the nine o'clock position of drum A as viewed in Fig. 4. Further rotation of the forming drum B causes the side wall 153 of the transfer device 151 to guide the cap C which is now moving in a counterclockwise direction into position on the forming drum in readiness for the forming operation. The plurality of individual radial plates 155 may similarly be replaced by an integral annular flange but, as noted previously, such is normally not preferable and is of use only in those special cases wherein such an integral flange is adaptable.

The forming drum B

As shown in Fig. 11, the outer periphery of the forming drum B is recessed to provide an annular space 157 between an upper annular flange or ring 158 and a lower annular flange or ring 159.

Spaced chambers or bores are provided within the upper annular ring 158 for the reception of the stationary forming punches or dies 160. Spaced bores are similarly provided within the lower annular ring 159 in alignment with the bores of the upper annular ring 158 for the reception of relatively movable die members 166 which comprise annular cap nests 168 suitably contoured to receive the caps or closures thereon. Secured to each cap nest 168 as by a set screw is a cap nest plunger 170. A link 102 secured to the cap nest plunger 170 by means of a pivot pin 94 raises or lowers the cap nest plunger, as desired, by a cam roller and toggle arrangement T, Fig. 16.

Recesses 161 are provided in the upper annular ring 158 in which are slidably mounted die elements or yieldable center forming punches 163. A center forming punch spring 165 is mounted within each recess 161 upon the upper surface of said center forming punch 163 and normally urges said punches downwardly. A center forming punch screw 164 extends upwardly from said center forming punch 163 and passes through said spring 165 into a centrally located bore within the forming punch 160 to assist the positioning of said spring 165 and to guide the sliding movement of the center forming punch 163.

As shown in Figs. 12 and 16, in the open die position the die element or center forming punch 163 normally extends downwardly below the level of an annular forming surface 169 of the stationary forming punch 160. The center forming punch 163 thus is the first die element to engage the closure C positioned thereunder to hold it in position and at the same time shut off the center surface area thereof while leaving an open annular space between the shut-off portion and the surrounding annular gasket blank 111.

If desired, the lower surface of the center forming punch 163 may be increased or decreased or varied in any way, or raised to the level of the annular surface 169 of the forming punch 160 which would then permit extrusion and flow of the annular gasket material over the entire inner surface of the cap or closure member.

After the die element 163 has contacted the cap, as shown in Fig. 14 and Fig. 23, the annular forming conical surface 169 contacts the annular gasket blank 111 progressively along the inner face of the gasket blank, thereby subjecting the material thereof to an advancing longitudinal and radial molding pressure, which urges the outer face of the blank into intimate contact with the inner face of the surrounding peripheral flange of the closure member C, and concomitantly extrudes or flows the inner portion of the blank over the surface of the closure member within the open annular space around the shut-off center forming punch 163. The upper annular surface 169 of the stationary die member 160 may be so shaped, as shown in Fig. 14 and Fig. 23 as to form a cavity capable of curling the edge of the peripheral flange of the closure member inwardly and downwardly to embed it in the material of the ring to protect it against exposure to the atmosphere and rusting and to protect the hands of the user against possible injury by cutting or scraping. The opposed mating surfaces of the forming surface 169 and the annular cap nest 168 are hardened and carefully ground to provide for precise molding of the gasket blank.

The toggle mechanism T

A plunger pin 94 is pivotally mounted in the lower portion of the forming-die plunger 170 and is raised and lowered by means about to be described with reference to Figs. 16, 18, 19 and 20. In Fig. 8, a similar plunger pin 94 is shown pivotally mounted in the lower portion of the anvil plunger 90 on the lower blanking-out die 52 and is raised and lowered by means similar to those disclosed in Figs. 16 and 18.

Secured to the underside of lower annular ring 159 as by bolts 96 are a plurality of vertically positioned grooved side plates 97 constituting fixed slide means for a toggle slide plate 98.

As shown in Fig. 19, each grooved side plate 97 comprises an inner straight-edged side to accommodate the toggle slide plate 98, and an outer angular side having a side parallel to its inner side and a side 97' at an angle thereto. The sides 97' fall upon radii of the lower annular ring 159 and can be juxtaposed with corresponding sides of adjacent side plates to form a closely fitting organization capable of being secured to the lower annular ring by bolts 96. Semicircular recesses are provided in the sides 97' to permit one of the bolts 96 to hold two sides 97', thus providing a common means of attachment.

Pivotally secured to the toggle slide plate 98 by pivot pin 99 and adapted to reciprocate therewith is a triangular link plate 100 having a bifurcated end portion (the left-hand end as viewed in Figs. 16 and 18) having aligned bored holes 101 in both branches of said bifurcated end portion. The upper bored holes 101 are adapted to receive a pivot pin 95 upon which is mounted the link 102 connected to the plunger pin 94 of the anvil plunger. The lower bored holes 101 are adapted to receive a pivot pin 105 upon which is mounted a link 106 connected to, and adapted to rotate on, a fixed pin 108 secured in a bore 109 in a downwardly extending portion of the side plates. A lock screw 112 is adapted to secure the pin 108 in fixed position in the downwardly extending portion of the sides plates.

It will be apparent from Figs. 16 and 18 that the links 100, 102 and 106 comprise a toggle linkage and that horizontal movement of the reciprocating toggle slide plate 98 will carry with it the triangular link plate 100 to align the links 102 and 106 to elevate the plunger 170 (Fig. 18) or to collapse the links 102, 106 to depress the plunger 170 (Fig. 16).

A cam roller 103 is rotatably mounted on a stub shaft secured to the reciprocating toggle slide plate 98 and extends outwardly beyond the circumference of the lower annular ring 159 and is positioned as to be urged outwardly by cam means 182 to collapse the toggle mechanism and lower the movable die member 166, or urged inwardly by cam means 181 to align the toggle links and to raise the movable die member 166.

A bracket 82 is secured to the inner lower portion of the side plate 97 by bolts 83 and has an upstanding inner wall on which is mounted an adjustable stop-screw attachment 85 to limit the inward movement of the toggle slide plate 98.

As shown in Fig. 19, bolts 83 secure the bracket 82 to the side plates 97 and keep them properly spaced to permit sliding movement of the toggle slide plate 98. Front plates 113 are secured by bolts 116 to the outer parts of side plates 97 to maintain the correct spacing thereof for the toggle slide plates 98 at that position.

Consideration of Fig. 6 and reference to drum A will show that a cam surface 104′ of main blanking-out cam 104 provides for an inactive period for the cam roller 103 prior to the blanking-out operation. When cam roller 103 is guided between cam surface 104 and a ring cutting cam 91, the cam roller 103 is urged inwardly to tend to elevate the lower die member 52 and blank out the circular disk 110 and the annular gasket 111. This occurs at approximately the 12 o'clock position of the dies on the blanking-out drum A. Continued rotation of the drum A will guide the cam roller 103 on cam surface 107 which controls the maximum movement of cam roller 103 and consequently the maximum elevation of the lower die member 52. When cam roller 103 is guided between that portion of cam surface 104 and ring cutting return cam 93, the cam roller is urged outwardly to tend to depress the lower die member 52 to separate the die members which occurs at approximately the three o'clock position of drum A.

As illustrated in Fig. 6, the main blanking-out cam 104 is divided into four sections and is pivoted at points 114 to provide for adjustability of the cam 104 with particular attention being given to cam surface 107 which controls the height to which the anvil plunger will be elevated.

As shown in Figs. 6 and 6a, an operating handle 200 is mounted in brackets 203 and has a lower cam shaped portion 201 pressing against a control lever 204. Movement of control lever 204 will vary the position of the central cam pivot point 114 and the distance through which the cam roller 103 will be urged.

Movement of the control lever 200 will thus determine the depth of cut of the dies in the strip 44 and adjustment may easily be made to cut completely through the strip to form gasket blanks, or merely to cut partially through the strip to grip the material thereof but not to form completely cut-out blanks.

Cam guide 115 is employed to insure that the cam roller 103 is initially grounded on the cam 104 as it approaches the blanking-out station; and cam guide 117 is used for a similar purpose, if and when the drum is to be rotated in a direction other than normal.

After emerging from between cams 104 and 117 (see Fig. 6), the roller 103 revolves freely until contact is made with cam 147 which urges the roller inwardly to sufficiently elevate the lower blanking die 52 carrying the closure so that it approaches the cylindrical cutters 78 and 80 from which is ejected the annular gasket blank. A return cam 149 urges the roller 103 outwardly and returns the die 52 to its lowered position.

From this position, the closure and annular gasket blank are carried to the transfer point (nine o'clock position on drum A) whereat they are shifted to the molding drum B.

It will be apparent from Fig. 11 that when the cap C and the annular gasket inserted therein are interposed between the upper and lower dies of drum B, upward movement of die 166 will mold the annular gasket into the desired configuration between the annular forming face of the stationary die and the annular forming face of the movable die. A cam 181 (Fig. 6) positioned around the rotatable drum B, is adapted to control the relative position of roller 103 and consequently the elevation or depression of movable molding die 166. A cam 182 closely controls the inward movement of roller 103 on the cam surface 181 at approximately the one o'clock position of rotatable drum B, whereby the dies are closed (Fig. 11) to mold the annular gasket to the desired shape and size. Movement of cam roller 103 on cam 181 maintains the dies closed during the molding operation until cam 184 moves cam roller 103 outwardly to open the molding dies at the completion of the molding operation which occurs at approximately the six o'clock position of drum B.

It has been discovered that, with certain types of rubber compounds, a superior product is possible if, immediately after the upper and lower dies come together on the moldable strip at the one o'clock position to mold the same, they are separated slightly, and then brought together again. During this slight separation, the center forming punch 163 remains spring pressed against the inner surface of the closure member and the moldable material cannot flow inwardly. This separation may be repeated a second time immediately after the first separation before the dies are brought together again to remain in a closed molding position for a definite portion of the rotation of the forming wheel.

The forming dies remain closed after the two initial "bumps" and open eventually at the six o'clock position of drum B to permit a removal of the cap with a completely molded gasket therein. As shown in Fig. 6, the relatively movable dies 160, 166 are separated by means of the return cam 184 which urges the cam roller 103 outwardly whereby the toggle linkage 100, 102, 106 is collapsed to lower the die 166.

*The closure ejecting mechanism*

Inasmuch as the closure C is sunk into the surface of the annular cap nest 168 during molding (Fig. 11), some means must be employed to raise the cap before an ejecting arm which sweeps across the surface of the cap nest can contact it and slidably eject it. Such a means is disclosed in detail in Fig. 12 and includes a circular cap nest 171 which is relatively movable with respect to the annular cap nest 168 and the cap nest plunger 170. A cam plunger pin 173 is secured to the bottom of the circular cap nest 171 by means of a cap screw and the lowermost portion of said cam plunger pin 173 is cut to form a triangular wedge which is seated within a complementary triangular notch in the horizontally extending cam plunger rod 175. A cam plunger pin spring 177 is seated on a ledge of the cam plunger pin 173, and tends to urge it downwardly into contacting engagement with said triangular notch and to return the circular cap nest 171 to its lowered position.

The cam plunger rod 175 has a projecting end 178 (Figs. 12 and 6) which protrudes outwardly in slots 176 formed in the lower annular ring 159 and the bushings 86 located between said ring and the slidable lower die member 166. A cam 180 situated outside the circumference of the lower annular ring 159 at approximately the five o'clock position of drum B is adapted to contact the projecting end 178 of the cam plunger rod 175 to urge it inwardly and raise the cam plunger pin 173 against the resistance of its spring 177 to elevate the center cap nest and raise the closure to a position wherein it may be contacted by the ejecting means. During this time the annular cap nest 168 and the cap nest plunger 170 are not elevated with the result that the closure and the gasket molded therein are raised clear thereof and in position to be picked off the surface of the circular cap nest 171.

As shown in Figs. 1 and 5, the closure ejecting means comprises an ejecting arm 185 positioned to extend across the face of the cap nest 168 and to sweep the closure therefrom and to push it outwardly into the grooves 155. Continued rotation of drum B guides the closures outwardly in the grooves and onto a downwardly inclined chute 186 from which the closures drop on a slowly moving belt 187 to be carried through a suitable heating zone such, for example, as a curing oven O. The speed of travel of the belt through the curing oven may be such as to cause the caps to be completely cured or vulcanized by the time they emerge from the curing oven. Banks of infra-red lamps, or high frequency heating, or circulating heated air, etc., may be used to supply the necessary heat. At the conclusion of the heating, the articles are in finished form and ready for use.

The guide rollers 47, shown in Figs. 1 and 2, may be rotated merely by the pull of the advancing strip of material. However, should a closer control over the delivery and return of the strip be desired, they could be suitably driven by any well known mechanical expedient such as belting, gearing, chain-and-sprocket, etc., from the main drive. A chain-and-sprocket 54 arrangement is disclosed in Fig. 3 to illustrate a preferred drive means. Other means whereby a desired speed differential may be maintained by the guide rollers as they progressively advance the strip have been employed with advantageous results.

It has been observed that, during the time that the blanking-out dies are carrying the strip 44 in an arcuate path on drum A, the blanking-out dies 51, 52 will compel the strip 44 impaled thereby to temporarily assume a similar arcuate configuration. During this blanking-out operation, wrinkles will be created in the inner peripheral portion of the strip. Although this wrinkling will have substantially no effect on the blanked-out articles, it is advisable to position resiliently mounted tapered guide plates 68 (Fig. 8) edgewise between adjacent cutting die members with the deeper end 69 of the taper positioned radially inwardly of the die carrier. When the strip is curved arcuately, this deeper end 69 controls and shapes the undulations in the inner peripheral portion of the strip 44 and takes up the slack and thus a substantially flat section is always present around the die members to prevent any possibility of improper gasket formation, or binding or sticking, when the strip is removed.

Hollow cores 89 may be provided in the annular flanges or rings 74, 75, 158 and 159 to provide for the passage of heating or cooling media, as desired, whereby said rings may be heated or cooled to the same or different temperatures.

The annular gasket 111 shown in Fig. 13 has been illustrated at the moment it is being deposited within closure cap C and is slightly bulged at the sides. It has been found that the cross section of the annular gasket 111 is blanked out as shown, rather than perfectly rectangular as would be theoretically presumed.

The closure cap C is also illustrated as having a slightly inwardly turned rim. This is termed a "coaxed" rim and the purpose of such "coaxing" is primarily to assist in maintaining the annular gasket within the closure cap when the transfer punch 137 is withdrawn and to assist the later curling of the rim inwardly to become embedded within the moldable material. The curling is, of course, brought about by the flared conical outer portion of the surface of the stationary die member 160, as shown in Figs. 14 and 23.

A comparison of Figs. 13, 23 and 14 readily reveals the extent to which the inner portion of the annular gasket is, in effect, sheared off and caused to flow downwardly and inwardly to intimately contact the closure member and to become adhered thereto. The flared conical surface 169 initially contacts the upper left edge (Fig. 23) of the annular gasket and, since its outside diameter is greater than the inside diameter of the annular gasket, the inner portion of said annular gasket is molded downwardly in a plastic flow into the final configuration shown in Fig. 14. The shut-off function of the die element, or the center forming punch, 163 is well shown in this figure.

As shown in Fig. 7, a suitable clutch 190 may be positioned on shaft 61 to provide for desired interruptions of the driving train from the motor 29 to the drums A and B. A clutch lever 179 (Fig. 3) may be provided and may be manually controlled by the operator to move lever 191 to the right, as viewed in Figs. 3 and 7, to rotate bell crank 197' counterclockwise to separate the clutch faces of clutch member 190 on shaft 61 to stop the rotation of the drums A and B without discontinuing operation of the plasticizing milling rolls 22 and 23.

During such periods of inactivity of the drums A and B, it is frequently found advisable or necessary to rotate the drums to some degree. Provision, therefore, is made in the frame 25 for suitable bearings to support a crank member 189 which fits into an end socket of shaft 192 to rotate the same in bearings 193. Shaft 61 is rotated by the shaft 192 by means of a chain and sprocket 197 and thus independent and simultaneous rotation of the plasticizing milling rolls 22 and 23 and the drums A and B is possible.

The use of clutch 190 permits the independent rotation of the milling rolls to warm and plasticize the batch of moldable material to the desired plastic qualities prior to blanking-out of the strip 44 in the molding drum A. The use of the crank member 189 permits the rotation of the drums in either direction at any desired speed and is of particular advantage in the event of a jam or of other mishap requiring such manual rotation of the rotatable drums independently of the plasticizing mill.

As shown in Fig. 7, an electrical switch 188 may be provided in the frame 25 and may be held in normally closed-circuit position to permit operation of the molding machine. The switch 188 is pivotally arranged on frame 25 so that a projecting arm thereof is adapted to be engaged by the entry of the crank member 189 to open the circuit and prevent operation of the molding drums. Thus, when crank member 189 is in position, there can be no accidental starting of the molding drums.

During the period when the plasticizing mill is warming the batch to the proper plasticity and consistency, strip material is being produced which is not of the desired properties. The strip may be trained around the guide rollers and returned to the plasticizing mill without entering the drum A until satisfactory operating conditions have been attained.

It is frequently advisable during the initial starting of the molding machine or occasionally in the course of its operation to discontinue the production of closure members temporarily. As shown in Figs. 6 and 6a, an operating handle 200 having a cam shaped lower portion 201 is adapted to rotate on shaft 202 and move control lever 204, which is pivoted to center pivot 114 of cam 104. Movement of cam 104 outwardly at this point discontinues the operation of cam roller 103 at the 12 o'clock position of drum A with the result that no blanking out takes place and the strip 44 is returned in whole condition to the plasticizing mill. Thus, in order to insure the continued movement of the strip in the correct position on the drum A, cam 104 may be withdrawn only sufficiently to move the dies together just enough to grip the strip but not to cut through it.

The feeding of the closure caps may be, of course, discontinued during this time and should be started again just prior to the return of control lever 204 to operating position to resume the cutting out of the annular gasket blanks at the 12 o'clock position of drum A.

Figs. 15 and 17 depict the construction of the upper mounting of the stationary die member 160. Cross plates 195 rest upon the top surfaces of the stationary die members 160 and are held downwardly by resilient plates 196, which are secured to the upper annular ring 158. Should necessity demand that the die members 160 yield slightly in an upward direction, the plates 196 will yield to permit such movement of die member 160. Thus, an overload absorber principle is in operation to prevent breakage of parts in the event of a jam or other mishap.

Preliminary operation of the complete machine

The batch 20 of gasket material is introduced into the trough formed by the milling rollers 22 and 23 and the motor 29 is started. Inasmuch as the batch of material is cold at this point, it must be worked considerably to eliminate its lack of pliability and cohesiveness since it cannot be introduced between the cooperating dies of the rotatable drums until it has been warmed and placticized to the proper degree of plasticity and moldability. The milling rollers are permitted to knead and work the batch into layers through the bite of rollers 22 and 23. During this time the cutters 46 may be cutting into the layer but no strip will be removed therefrom. If desired a strip 44 of gasket material may be separated therefrom by the cutters 46 and may be manually draped over the nearest guide roller 47 and returned to the milling rollers for reincorporation therein. Clutch lever 179 is thrown to disconnect the drive for the rotatable drums A and B so that they need not rotate idly without having strip material fed thereto.

The milling rollers are allowed to knead and work the batch of gasket material until it possesses the necessary plastic qualities. The rolls may be heated to desired temperatures to attain the precise degree of consistency desired. When this point is reached, the short loop of the strip material draped around the guide roller 47 is severed and the mill permitted to run a sufficient time longer to produce a slack length of strip material of several feet. The motor 29 is shut off and the milling rolls temporarily stop. If no strip was removed originally from the milling rolls, a cut in the strip just after the operation of the cutters 46 and separation of the cut strip from the rollers will also yield a length of slack strip material to be worked with in setting up the machine for actual production.

If desired, the cutters 46 may be supported on a pivotal mounting and may be rotated to a position out of contact with roller 22 prior to the forming of strip material. When desired, the cutters may be rotated into position to contact roller 22 and cut a narrow strip from the broader layer covering the surface of roller 22.

Handle 189 is then inserted in the frame 25 and the rotatable drums are slowly and manually turned. The strip material 44 is fed over the guide roller 47, 47a and 47b and is introduced between the cooperating die members which will close to engage the strip material.

Inasmuch as the closure cap feed chute is empty at this time, there is no desire or need to blank out circular disks or annular gasket blanks. Therefore, operating handle 200 is thrown to the position which causes cam 104 to withdraw and prevent the dies from approaching each other sufficiently to completely cut through the strip. The dies do approach each other sufficiently, however, to engage the strip and penetrate it slightly so that the rotation of the drums causes the strip to follow it around in arcuate fashion.

When the die members separate, the entire strip is freed therefrom and, upon continued manual operation of the handle 189, sufficient strip material is fed through to take up the slack in the strip material extending from the stationary mill around the guide rollers to the die members on the rotatable drum A. The leading end of the strip material is then reintroduced into the trough to form a continuous cycle and the mill is ready for operation.

The crank handle 189 is removed to disengage the safety cut-out switch 188. The clutch lever 179 is moved to bring the rotatable drums A and B back into driving connection with the motor 29. When the motor 29 is restarted, the strip material will be cut from the milling roller 22 by the cutters 46 and passed around guide rollers 47, through the rotatable drum A and cooperating die members thereon, without being perforated, and returned to the warming or plasticizing mill M.

When the machine has attained a constant operating speed, the closure cap feed chute is connected to a suitable source of supply of closure caps which will completely fill the feed chute 136. The operating handle 200 is then thrown over and the cooperating dies will be brought together sufficiently to cut out an annular gasket blank and the included circular disk from the strip material.

In the event that the circular disk 110 cut from the strip material 44 tends to fall prematurely away from the lower surface of the center stripper 130 of the upper die and fall into the machinery to affect harmfully the operation thereof or to fall to the floor and to be wasted, means can be provided to insure that the circular disk 110 remains associated with the center stripper 130 as long as desired so that it may be removed at the proper time to be adhered to the skeletonized strip and returned to the mill.

For example, as shown in Fig. 24, such means may comprise pronged elements 210 which are carried by the inner cutter holder 81' and extend downwardly through holes 212 formed in the center stripper 130'. When the blanking-out dies are brought together, the prongs 210 will pierce the blanked-out circular disk 110 and will hold it fast to the center stripper 130'. Therefore, when the dies are separated, there will be very little possibility of the center disk 110 dropping downwardly prematurely. When the center disk 130' is urged downwardly to remove the center disk 110 and adhere the same to the skeletonized strip to be returned to the mill, it will strip the disk from the prongs without any difficulty. It is appreciated that other means could be used to hold the disk positively to the stripper 130', without departing from the scope of the present invention.

Such positively holding means could be applied to any of the strippers disclosed in the present case, wherever such are considered necessary or desired.

Figure 26:
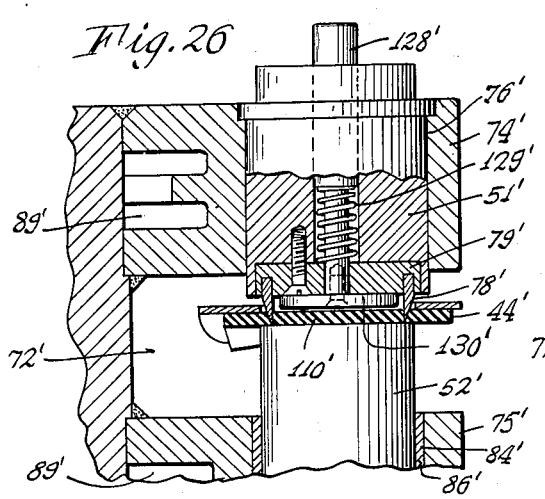
Fig. 26 is a cross-sectional view of the modified blanking-out dies taken on the line 26—26 of Fig. 25, the blanking-out position.
Figure 27:
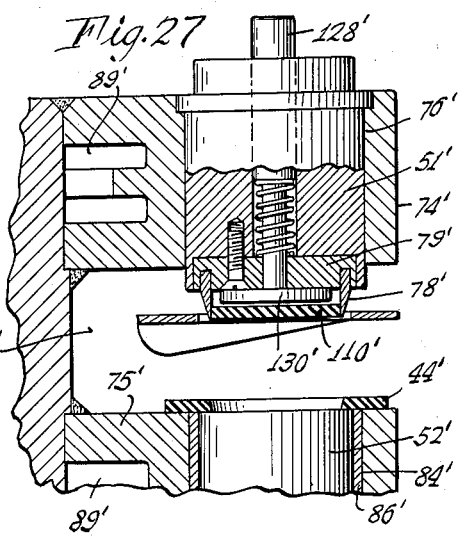
Fig. 27 is a cross-sectional view of the modified blanking-out dies taken on the line 27—27 of Fig. 25, the blanked-out strip release position.

In the event that it is desired to blank out circular or annular members or articles of any particular size or shape and to remove them from the machine for further treatment or use as such, rather than in conjunction or association with structural elements such as metallic caps, or container lids, etc., a modification of the rotatable blanking-out drum illustrated in Figs. 1–24 can be employed. One example of such a modified blanking-out drum is shown in Figs. 25 to 27 where in blanked-out members in the shape of circular disks are being formed. However, such a circular shape is not to be construed as limitative of this modification of the present invention but is merely illustrative thereof and, as will be disclosed hereinafter, any other desired shape or size may be selected and obtained depending on the particular requirements or needs involved.

Fig. 25 is a schematic showing of a similar nature to Fig. 1 and wherein merely a sufficient number of cooperating elements is illustrated to describe the general operation thereof.

In the broader aspects of this modification of the present invention, the continuous strip material 44' is guided from the plasticizing mill M' and is introduced tangentially to a blanking-out drum A' between opposed blanking die members thereon in very much the same fashion as shown in Figs. 1 and 2. Blanking-out drum A' is fixed on a vertical shaft and is driven by suitable gearing (not shown) in synchronization with the plasticizing mill, as described previously.

As shown in Fig. 26, the opposed dies are caused to move relatively with respect to each other and clamp down upon the interposed strip 44' to impale the same and blank out therefrom an article of a shape corresponding to that of the cutting dies. This blanking-out step occurs at approximately the twelve o'clock position of drum A' in Fig. 25. The opposed dies are then caused to separate to free the strip from which the articles have been blanked. This is the separated position illustrated in Fig. 27. The strip then diverges tangentially away from the blanking-out drum A' and is returned to the plasticizing mill M' where it is commingled with the batch of moldable material 20' in a similar way to that previously described.

The article blanked-out, however, remains within the cutting die and is carried around the periphery of the drum A' until a knockout member 122' positioned at approximately the four o'clock position of the drum as shown in Fig. 25 is operated upon to eject the article onto a lower flange surface of the blanking-out drum A', as shown in the cut away portion of Fig. 25. Further rotation of the blanking-out drum will cause the article to be struck by a projecting arm 151' which extends angularly across the lower flange surface. This operates to eject the article onto an inclined ejecting chute 226 which will carry the blanked out articles away from the drum.

In Fig. 26 there is shown in more detail the construction of the preferred embodiment of the blanking-out dies to be mounted on the periphery of the blanking-out drum. The drum comprises an upper annular flange or ring 74' and a lower annular flange or ring 75' which may be integral with the hub of the drum A' but which may be made separately and welded thereto. Flanges 74' and 75' are spaced from one another axially on drum A' so as to provide an annular operating recess 72' therebetween.

Heating or cooling media, such as water or steam or any other desired means, may be circulated through hollow passages 89' located in the flanges 74' and 75' in order to heat or cool the flanges and dies as desired.

Spaced around the edge of the upper flange 74' are a series of bores or cavities 76' in which are securely positioned upper die members 51'. These die members 51' are stationary and are constructed somewhat along the general lines of the die members 51 of Fig. 8 and their construction will not be gone into in any greater detail than is required to bring out the distinctions therebetween. The particular die member 51' illustrated in Figs. 26 and 27 is constructed to make circular members, but it is, of course, obvious that changes could be made in order to produce other shapes or sizes. Elements in the modified form of die illustrated in Fig. 26 which have counterparts in the die shown in Fig. 8 will be referred to with the same reference numeral followed by a prime.

A cylindrical cutting element 78' is mounted in a groove in the face of a circular cutter-holding member 79' and the cutting edges extend downwardly so as to penetrate any object brought thereagainst. The cylindrical cutting element 78' is fixed within a holding member or disk 79' which is, in turn, secured by means of bolts to the main body of the die 51'. Such an arrangement provides for the simple removal of the cylindrical cutting element 78' and its replacement by other holding members having different shapes or cutting elements.

A stripper member 128' is mounted to slide within a hollow recess formed in the center of the die 51'. The upper end of the stripper member 128' protrudes upwardly beyond the uppermost part of the die member 51' and is adapted to be struck at the proper moment by a rocker arm of the knockout member 122' so as to be driven downwardly. The construction of the knockout member 122' and its associated actuating arm 125' is identical to the knockout member illustrated in Fig. 21 and described hereinbefore. It is to be noted merely that the knockout member in the modification of Figs. 25–27 is located at a different angular position on drum A' but, otherwise, there have been no changes.

A stripper return spring 129' is mounted within a hollow recess of the die 51' and is seated on the holding member 79' and returns the stripper member 128' upwardly to its inactive position. A stripper plate 130' is secured to the lower end of the stripper member by means of a bolt and extends downwardly within the cylindrical cutter 78'. It will be apparent from Fig. 26 that when the stripper member 128' is pressed downwardly, it will urge the stripper plate 130' downwardly against the circular member 110' to eject it.

The lower flange 75' is spaced at a predetermined distance from the upper flange 74' and has spaced around its peripheral edge a series of bores or cavities 84' provided with bushings 86' in which are positioned movable die members 52'. These movable die members 52' are similar in construction and operation to the movable die members 52 such as illustrated in Fig. 8 and their operation by a toggle linkage T such as disclosed in Figs. 19 and 20 and described hereinbefore need not be discussed further. It is merely necessary to add that when the lower movable die member 52' is urged upwardly as shown in Fig. 26, it will be moved into a position in proximity with the cylindrical cutting member 78' whereby the circular member will be blanked from the strip material, as in Fig. 26. It will also be seen from Fig. 27 that when the lower movable die 52' is lowered its upper surface will be flush with the upper surface of the lower flange 75'. In such a position it will be clear that any strip material or circular member positioned on the upper surface of the flange 75' may be slid or may slide outwardly without obstruction from the die member 52', to be removed from the drum A'.

It is frequently desired in the preparation of circular disks that these disks be furnished in sets of various sizes. If all of the blanking-out dies were of the same size it would necessitate setting up the machine each time a different size was required. For example, if a particular set required three different sizes, it would be necessary to set the machine up first to make one size; then it would be necessary to remove all dies and replace them with smaller size dies and then run the machine a second time until a sufficient number of smaller size disks was obtained; and then it would again be necessary to remove the dies and replace them with even smaller dies and run the machine a third time until a sufficient number of the smallest size of disks was obtained. This is obviously time consuming, uneconomical and inefficient.

Figure 28:
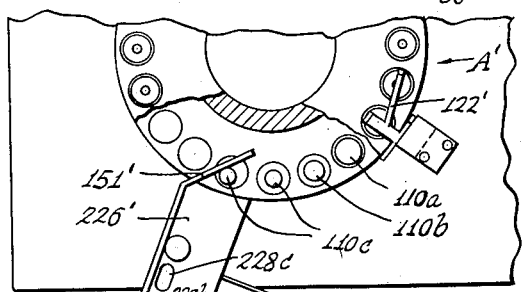
Fig. 28 is a fragmentary schematic showing in plan view of another modified form of the molding machine.

The blanking-out drum shown in Fig. 28 is a means whereby all of the disks, even though of different sizes, may be manufactured at one time. It is to be pointed out that any number of disks of different sizes may be blanked out at one time, up to the number of blanking dies on the drum and that, furthermore, the shape is not limited to circular but may be any desired shape.

As shown in Fig. 28, the drum A' has been set up to produce three differently sized disks 110a, 110b and 110c and to produce two disks of size 110c. This is made possible by the use of three differently sized blanking-out dies having cylindrical cutting elements of different diameters corresponding to the different diameters of the disks 110a, 110b, and 110c.

A deflecting arm 151' is angularly positioned across the surface of the lower flange and sweeps the blanked-out members outwardly onto an inclined chute 226' where they slide downwardly away from the blanking-out drum. Due to the different sizes of disks being manufactured, a modified form of chute 226' has been devised whereby the different sizes may be segregated automatically. The disks are swept from the lower cylindrical flange by the deflecting arm 151' and are urged outwardly onto the chute 226'. As shown, the chute has several different sizes of openings 228c, 228b and 228a therein. It will be appreciated that if the circular disks slide forwardly against a rail 230, the smallest disk 110c will fall into the first opening 228c which is the smallest and will drop downwardly into a segregating chute 232c and be carried away. The next larger size of circular disk 110b is of sufficient diameter so that it will pass over the first and smallest opening 228c without falling in and will then proceed to the second opening 228b. This opening is larger than the first opening and is large enough so that the medium size circular disk 110b will fall into it and drop downwardly onto the second segregating chute 232b. The largest circular disk 110a is of sufficient diameter so that it can pass over the first and second openings but will fall into the third opening 228a and drop to the third segregating chute 232a.

Figure 29:
Fig. 29 is a cross-sectional view of a modified ejecting chute taken on the line 29—29 of Fig. 28.

As shown in Fig. 29, the chute 226', in addition to being inclined away from the blanking out drum is also inclined toward the rail 230 so that the disks will move in contact therewith. A circular disk 110a having a large enough diameter to span the openings 228c and 228b and pass thereover is shown approaching the central opening 228a and it will be appreciated how the circular disk 110a will fall into the opening 228a whereas a disk of a smaller diameter will not reach this far along the chute 226'. The dotted outline of a disk in this figure indicates the manner whereby the disk 110a drops through the opening in the chute 226'.

Any number of sizes and shapes may be made at the same time on the modified form of the blanking-out drum shown in Fig. 28, merely by providing the dies necessary to blank out the various sizes and shapes and by providing a chute with a corresponding number of hole openings and a similar number of segregating chutes in the modification shown in Fig. 28 should it be desired to segregate the different sizes or shapes. Such a modified form of drum thus obviates the necessity of multiple setting-up of the machine which adds to the efficiency and economy of the operation.

It is not necessary that the number of cavities or die members in the blanking-out drum be an exact multiple of the number of different items being blanked out. The drums in the present invention have twenty cavities each and it is to be noted that there are three circular disks of different diameters being blanked out with a fourth disk of smallest size being formed, too. Any odd cavities, if present, could be filled with any desired die members of any preferred size.

The precise number of cavities of die members need not be limited to twenty, as shown, but may be increased whereby a greater variety of sizes and shapes may be made at one time and wherein greater production could be realized. The number of cavities or die members could similarly be decreased and a smaller wheel could be used but such is not desirable, if carried to too great an extreme. The decrease of production cannot be offset completely by increased drum rotations which would not provide sufficient time for cam and plunger movements and would create undesirably high centrifugal forces. Additionally, the increased curvature of the strip in following the periphery of a small drum would considerably increase the difficulties of handling the strip during the blanking-out operation.

The blanking-out drums of the present invention provide for a close control over the volumetric content of the disks being blanked out and such a factor adds to the value thereof.

*Production operation of the complete machine*

As mentioned, the strip material is cut from the milling roll 22 and is passed over guide rollers 47, 47a and 47b and is introduced between cooperating dies which blank out an annular gasket blank and the included circular disk. When the die members are separated, the annular gasket blank and included circular disk are retained within the dies but the perforated strip material falls therefrom and drops onto a shield plate 120 positioned thereunder. The circular disk is ejected from the die members and is pressed against the perforated strip and adheres thereto and may be returned therewith to the warming or plasticizing mill. The annular gasket blank continues in its arcuate path within the die members until it reaches an assembly station where a closure cap is automatically positioned thereunder. The annular gasket blank is then ejected from the die member and is deposited on the closure member. Continued rotation of the drum carries the closure member and gasket deposited thereon to a transfer station where a transfer arm 151 sweeps the closure member from its position on rotatable drum A and transfers it to drum B and aligns it with a pair of cooperating molding or forming dies. The dies are then brought together to mold the gasket blank, in situ, within the closure member. The forming dies remain closed for a considerable portion of the travel of drum B. The dies ultimately are separated and the closure member and molded gasket therein are elevated so as to be contacted by an ejecting cam arm 185 which removes the closure member from drum B and slides it onto an inclined chute, down which the closure member slides to drop onto a slowly moving belt 187 which carries the closure members through a curing oven O. The speed of the moving belt is so arranged that the molded gasket is completely cured by the time it reaches the end of the oven and the closure members fall into a container and, when cooled, are ready for use.

In Fig. 22, the completed closure C' is seen in sealing engagement upon a container or jar J. The side sealing effect of the molded gasket is to be especially noted in this drawing.

Thus, according to the present invention, molded gaskets or liners having highly efficient qualities may be provided on the undersides of closure members such as jar lids or bottle caps in a very economical manner without waste of the moldable material and by a rapid continuously automatic machine in which the gaskets or liners are blanked out, extraneous material removed, the gaskets or liners deposited in closure members and molded and adhered thereto at successive stations of the apparatus and finally ejected to be hardened to the desired qualities of the finished product.

Variations and modifications may be made within the scope of the claims and portions of the improvements may be used without others.

I claim:

1. A machine for making gaskets comprising cooperating dies; means to guide and feed a strip of gasket material between said dies; means to operate said dies to cut out from said strip and retain in one of said dies an annular gasket blank and the material included thereby; means to separate said dies to free said strip therefrom; means to eject said included material from the retaining die and press the same adherently against said freed perforated strip; means to direct said freed strip and adherent material away from said dies; and means to eject said gasket blank from said die.

2. The invention as defined in claim 1 in which the means for ejecting the included material comprises a plunger carried by and within the die, and in which there are means for operating said plunger with a rapid ejecting and returning movement.

3. The invention as defined in claim 1 having a shield plate to support the perforated strip when the included material is pressed adherently thereagainst.

4. A machine for making gaskets comprising means to produce a continuous moldable gasket strip; cooperating die members; means to guide and feed said strip between said die members; means to operate said die members to cut out from said strip and retain in one of said die members an annular gasket blank and the material included thereby; means to separate said die members to free therefrom the strip skeletonized by the removal of said blank and included material; means to eject said included material from the retaining die member and press the same adherently against said skeletonized strip; means to eject said gasket blank from said die members; and means to return said strip and adherent included material to said strip producing means to be reused, whereby all the moldable material in excess of the amount required for the gasket blank is recovered.

5. A machine for continuous making gasket-carrying closures, comprising means to produce a plasticized continuous strip of gasket material; a plurality of pairs of cooperating gasket-blanking dies mounted to travel along a predetermined path; means to cause said strip to travel into the path of and between said dies; means to close said dies successively on spaced portions of said strip to blank out and retain annular gasket blanks and the material included thereby and to impale the strip; means to open said dies successively to free said strip therefrom; means to eject said included material successively from said dies and press the same adherently against a remaining portion of said strip; means for guiding the strip and adhered material from the path of the dies and return the same to the strip plasticizing and producing means to be reused; means for positioning closures in alignment with the gasket-retaining dies after the latter have moved beyond the path of said strip; and means successively to eject said gasket blanks from said dies and deposit the same on said positioned closures.

6. In a machine for applying rubber gaskets to closures, a rotatable drum; a plurality of pairs of cooperating die members mounted on said rotatable drum for forming gasket blanks and assembling the same on closures; a closure feeding device comprising radial plates mounted on the periphery of said rotatable drum for rotation therewith and extending fanlike outwardly therefrom; a groove in each radial plate extending into alignment with each pair of said die members; a closure feed chute with which the grooves in said radial plates align to feed closures one at a time into successive grooves thereof; and means to control the movements of the closures in said grooves and to position the same in alignment with said cooperating die members.

7. In apparatus of the character described, a rotatable drum; a plurality of pairs of cooperating die members mounted on said rotatable drum for forming gasket blanks and assembling the same on closures; a closure feeding device comprising radial plates mounted on the periphery of said rotatable drum for rotation therewith and extending fanlike outwardly therefrom; a groove in each radial plate extending into alignment with each pair of said die members; a closure feed chute with which the grooves in said radial plates align to feed closures one at a time into successive grooves thereof; means to control the movements of the closures in said grooves and to position the same in alignment with said cooperating die members; means for guiding a continuous strip of gasket material between and across the path of said pairs of die members; means for operating said die members to cut out from said strip and retain a gasket blank in one die member of each pair in advance of the positioning of the closures on the other die member of each pad; and means for operating the die members after the closure is positioned in alignment with the die members for depositing the gasket blank in the closure.

8. In a machine for applying rubber gaskets to closures, a first rotatable drum; die members mounted thereon for blanking a charge of predetermined volume of gasket forming plastic sealing material from a strip of said material and assembling the same within closures; guideways on said rotatable drum in which the closures slide and by which they are guided and controlled; a second rotatable drum; die members mounted thereon for molding the assembled gasket charges of plastic sealing material to desired shape within the closures; guideways on said second die-carrying rotatable drum for guiding and controlling closures, the outer ends of said guideways of the second drum lying close to the outer ends of the guideways of the first-named drum as the drums rotate; means for rotating said drums coordinately; and means to transfer the assembled closures and gasket charges from the guideways of the first rotatable drum to the guideways of the second rotatable drum as the drums rotate.

9. The invention as defined in claim 8 having means for feeding closures successively into the guideways of said first drum, and means for moving said closures successively into alignment with the die members carried by said first drum.

10. The invention as defined in claim 8 in which the transfer means comprises a cam located in the path of travel of the closures on said first drum to engage and move the closures outwardly in said guideways and into the guideways of said second drum, said cam extending over the guideways of said second drum and moving the closures inwardly in said guideways to a position aligned with said die members of said second drum.

11. In a machine for applying rubber gaskets to closures, a first rotatable drum; die members mounted thereon for blanking gaskets and assembling the same within closures; radial plates extending fanlike from said rotatable drum, said radial plates having grooves in which the closure members slide and by which they are guided and controlled; a second rotatable drum; die members mounted thereon for molding the assembled gasket blanks to desired shape within the closures; radial plates extending fanlike from said second die-carrying rotatable drum and having closure guiding and controlling grooves, the outer ends of said grooves of the second drum lying close to and aligning successively with the outer ends of the grooves in the radial plates of the first-named drum as the drums rotate; means for rotating said drums coordinately; and means to transfer the assembled closures and gasket blanks from the grooves of the first rotatable drum to the grooves of the second rotatable drum as the drums rotate.

12. Apparatus for providing a flanged closure having a side seal molded gasket for sealing glass containers and the like, which comprises, in combination, a first closure supporting means for a flange closure, a gasket blanking die, means to press said blanking die against a strip of moldable gasket material to blank therefrom a gasket blank of determinate volume, means for transferring said gasket blank from said blanking die to a flanged closure on said first supporting means, a second closure supporting means, means for transferring said flanged closure with the gasket thereon from said first to said second supporting means, a molding die with two elements relatively movable and in alignment with a closure on said second supporting means, said molding die having a leading center element covering the center of the closure and an outer relatively movable ring element to engage the gasket and apply pressure to expand and extrude the material of the gasket blank along the inner surface of the closure flange into adherent engagement therewith and to mold the gasket to the desired shape and size for sealing a glass container and means to apply molding movement and pressure to said die.

13. The invention as defined in claim 12 having a rotatable drum for carrying said blanking die and said first closure supporting means, a second rotatable drum for carrying said molding die and said second closure supporting means and means for continously rotating said drums in unison during said blanking and molding operations.

14. In a machine for making flanged side seal closures during continuous movement of the machine, the combination of means for continuously moving and feeding a strip of moldable gasket material, dies for cutting a charge of predetermined volume in the shape of a gasket ring from said moving strip, and for positioning said ring in a flanged closure blank adjacent the flange thereof, a molding die, means for transferring said closure to a position beneath said molding die during the continuous movement thereof and means for forcing said molding die through the inner portion of the ring to apply radial pressure along the inside thereof to mold the ring to size and shape and to cause the outer portion of the ring to intimately engage and adhere to the closure member.

15. In combination with plasticizing means to produce a strip of gasket material, cooperating dies; a rotatable drum to support said dies; means to guide said strip between said dies; cam means to close said dies to engage and carry therewith said strip and to cut therefrom and retain a gasket blank; cam means to open said dies to free the perforated strip for removal therefrom to be returned to the plasticizing means; and means comprising a manually operable control lever rendering said cam means inoperative to close said dies sufficiently to cut through said strip but operative to engage and grip the strip to carry the same therewith whereby the strip may be returned to the plasticizing means in imperforate condition during the preliminary operations necessary to plasticize the strip material and regulate its course of travel.

16. In combination with plasticizing means to produce a strip of gasket material, a plurality of pairs of cooperating die members; a rotatable drum for supporting said die members; means to guide said strip between said dies; cam means to close said dies to engage and carry therewith said strip and to cut therefrom and retain a gasket blank; cam means to open said dies to free the perforated strip for removal therefrom to be returned to the plasticizing means; means comprising a manually operable control lever rendering said cam means inoperative to close said dies sufficiently to cut through said strip but operative to engage and grip the strip to carry the same therewith whereby the strip may be returned to the plasticizing means in imperforate condition during the preliminary operations necessary to plasticize the strip material and regulate its course of travel through said rotatable drum; means for driving said rotatable drum during said preliminary operations; and means for operating said plasticizing means.

17. A machine for making gaskets comprising means to produce a continuous moldable gasket strip; cooperating die members; means to guide and feed said strip between said die members; means to operate said die members to cut out from said strip and retain in one of said die members an annular gasket blank and the material included thereby; means to separate said die members to free therefrom the strip skeletonized by the removal of said blank and included material; means to eject said included material from the retaining die member and press the same adherently against said skeletonized strip; means to eject said gasket blank from said die members; means to return said strip and adherent included material to said strip producing means to be reused, whereby all the moldable material in excess of the amount required for the gasket blank is recovered, said strip producing means being a warming mill; common drive means for said warming mill and said die-operating means; and a manually operated clutch to render said die-operating means inoperative, whereby said warming mill may be operated independently of the die-operating means preparatory to the forming of the strip.

18. The method of making a side seal closure, which comprises pressing a blanking die and a prepared strip of moldable gasket material together to blank from the strip a gasket ring of predetermined volume, transferring the ring from said die to a flanged closure member and positioning the ring therein adjacent the flange thereof, first pressing a die element against the center portion of the closure member to grip said member and to shut off said portion, then advancing a second die element along the inner face of the gasket ring to progressively apply a radial molding pressure to the ring, whereby the ring is pressed into intimate adhering contact with the adjacent surface of the flange, and then withdrawing the second die element from the ring while said first die element is in holding engagement with the closure member.

19. The method of continuously applying gaskets to closures, which comprises guiding and continuously moving a prepared strip of moldable plastic gasket material between successive pairs of cooperating dies, operating said dies successively to fill a cavity in one die of each pair with a measured charge of plastic material from said strip and to form a gasket blank of predetermined volume, at the same time transferring a previously formed blank from the cavity of another die directly to a closure member and positioning the blank therein in predetermined position, and at the same time applying sufficient molding pressure to a blank previously deposited in another closure member to cause the blank to flow and to assume the desired shape and size on and in intimate adhering contact with the adjacent surface of the closure member.

20. The method of continuously applying gaskets to closures, which comprises guiding and continuously moving a prepared strip to moldable plastic gasket material between successive pairs of cooperating dies, operating said dies successively to fill a cavity in one die of a pair with a measured charge of plastic material from said strip and to form a gasket blank of predetermined volume, separating previously closed cooperating dies and inserting a closure member between them, bringing another blank filled die to position adjacent an inserted closure member and then ejecting the gasket blank from said die to transfer it directly to said inserted closure member and positioning the blank thereon, and simultaneously applying sufficient molding pressure to a blank previously deposited on another closure member to cause the blank to flow and to assume the desired shape and size on and in intimate adhering contact with the adjacent surface of the closure member.

21. The method of continuously making side seal closures, which comprises guiding and continuously moving a prepared continuous strip of moldable plastic gasket material between pairs of relatively movable cooperating blanketing dies, pressing said strip between successive pairs of traveling dies to fill a confined space in one die of each pair to blank therefrom measured charges of plastic material in the form of gasket rings and retaining each said ring in said confined space in one die of each pair to control the volume and shape of the blanked rings, at the same time transferring rings from the confined spaces in the die members to a succession of closure members each having a flange of greater diameter than the outer diameter of the gasket blank ring and positioning the rings therein with the outer face spaced from the flange, at the same time transferring a succession of closure members in which said blanked rings were deposited to a succession of continuously traveling molding die members, and pressing successive molding die elements against the center portion of each blank-carrying closure member to hold said member on a supporting die member and then applying a sufficient progressively advancing longitudinal and radial molding pressure to the gasket ring, to cause the ring to flow and to assume the desired shape and size on and in intimate adhering contact with the adjacent surfaces of the flange and closure member.

22. The method of continuously applying gaskets to closures comprising continuously preparing a strip of moldable plastic gasket material, continuously advancing said strip past a given point, continuously advancing a succession of blanking dies past said given point, operating said blanking dies as they pass said given point to blank out of said strip and retain measured charges of predetermined volume of said plastic gasket material, placing a closure in axial alignment with each gasket retaining die as it passes another given point, then operating said blanking die as it continues to advance to eject the charge contained therein and deposit it in its aligned closure, then moving each charge-carrying closure to another station, then applying sufficient molding pressure to the measured charge thus deposited to cause the measured charge to flow and to assume the desired shape and size on and in intimate adhering contact with the surface of the closure, and while still applying said molding pressure carrying the gasket-carrying closures in succession to a given point at which said molded gasket-carrying closures are successively discharged.

23. The method of making a flanged side seal closure for sealing glass containers, which comprises positioning a ring of moldable gasket material of predetermined volume in the closure member adjacent said flange thereof, first pressing a die element against the center portion of the closure member to shut off said portion while leaving an open annular space between said shut off portion and the surrounding gasket ring, then advancing a second die element progressively along the inner face of the gasket ring to apply a progressively advancing longitudinal and radial molding pressure to the ring, and simultaneously sealing the flange against egress of the ring material past said flange, whereby the ring is shaped to size and pressed into intimate adhering contact with the adjacent surface of the flange and closure member, and a portion of the ring is extruded over the open annular space and adhered thereto.

References Cited in the file of this patent

UNITED STATES PATENTS

| Number | Name | Date |
|---|---|---|
| 1,250,256 | Weatherhead et al. | Dec. 18, 1917 |
| 1,447,816 | Peelle | Mar. 6, 1923 |
| 1,486,937 | Taliaferro | Mar. 18, 1924 |
| 1,492,510 | De Escobales | Apr. 29, 1924 |
| 1,750,708 | Edwards | Mar. 18, 1930 |
| 1,879,555 | Simmons | Sept. 27, 1932 |
| 1,956,012 | Eagan | Apr. 24, 1934 |
| 1,965,732 | Bisterfeld | July 10, 1934 |
| 1,996,048 | Madina | Mar. 26, 1935 |
| 2,098,906 | White | Nov. 9, 1937 |
| 2,155,088 | Hopkins | Apr. 18, 1939 |
| 2,158,044 | Haller | May 9, 1939 |
| 2,167,734 | Zonino | Aug. 1, 1939 |
| 2,300,290 | Johnson et al. | Oct. 27, 1942 |
| 2,304,141 | Bergmann | Dec. 8, 1942 |
| 2,324,312 | Meyer et al. | July 13, 1943 |
| 2,354,029 | Kingston | July 18, 1944 |
| 2,403,042 | Bogoslowsky | July 2, 1946 |
| 2,445,742 | Hoch | July 20, 1948 |
| 2,454,285 | Krueger | Nov. 23, 1948 |
| 2,498,489 | Haggart | Feb. 21, 1950 |
| 2,548,305 | Gora | Apr. 10, 1951 |
| 2,553,590 | Joswig | May 22, 1951 |